May 22, 1956 — R. VAHLE — 2,746,362
METHOD AND APPARATUS FOR ASSEMBLING CARTONS
Filed Aug. 10, 1950 — 13 Sheets-Sheet 1
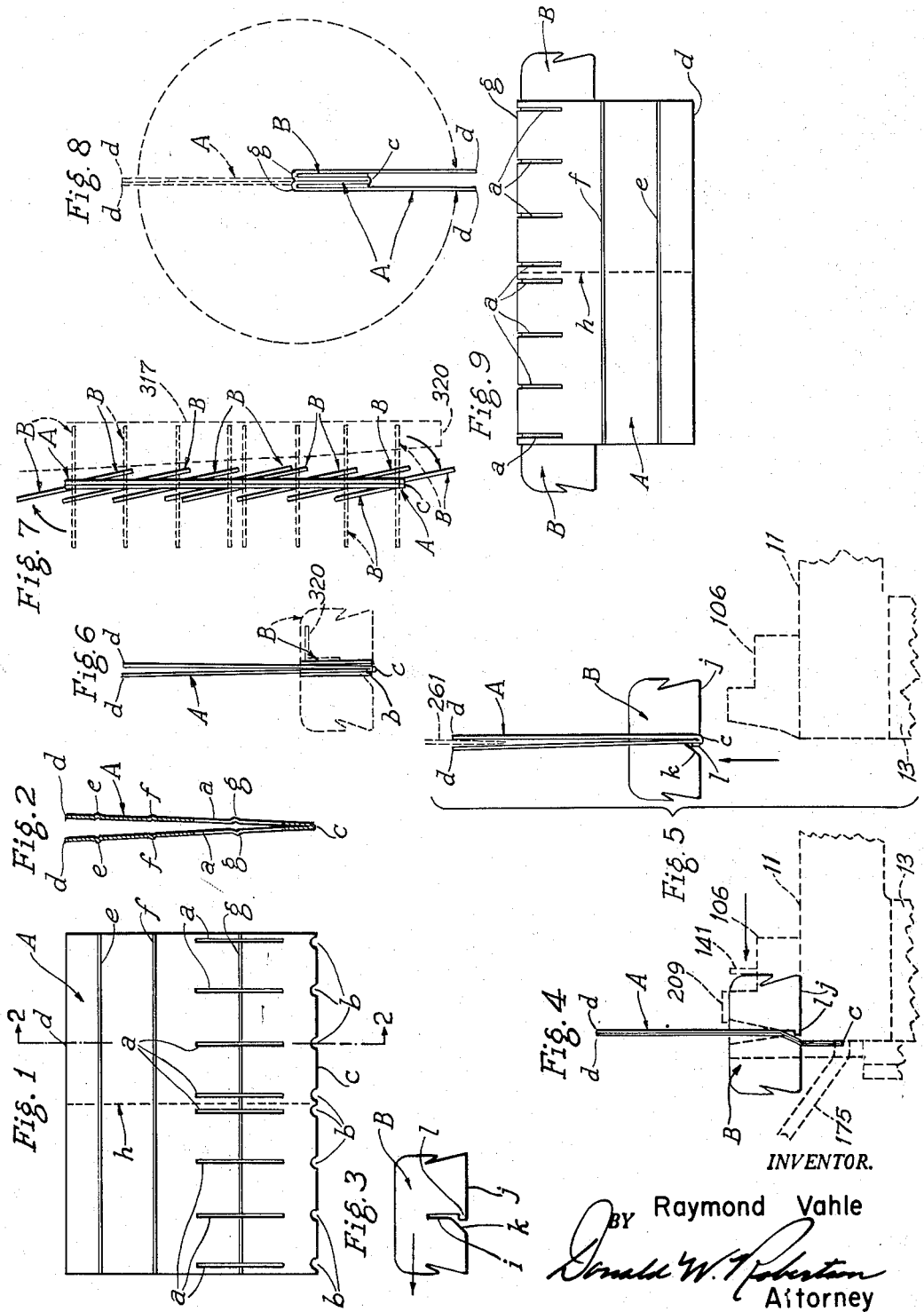
INVENTOR.
Raymond Vahle
BY Donald W. Robertson
Attorney

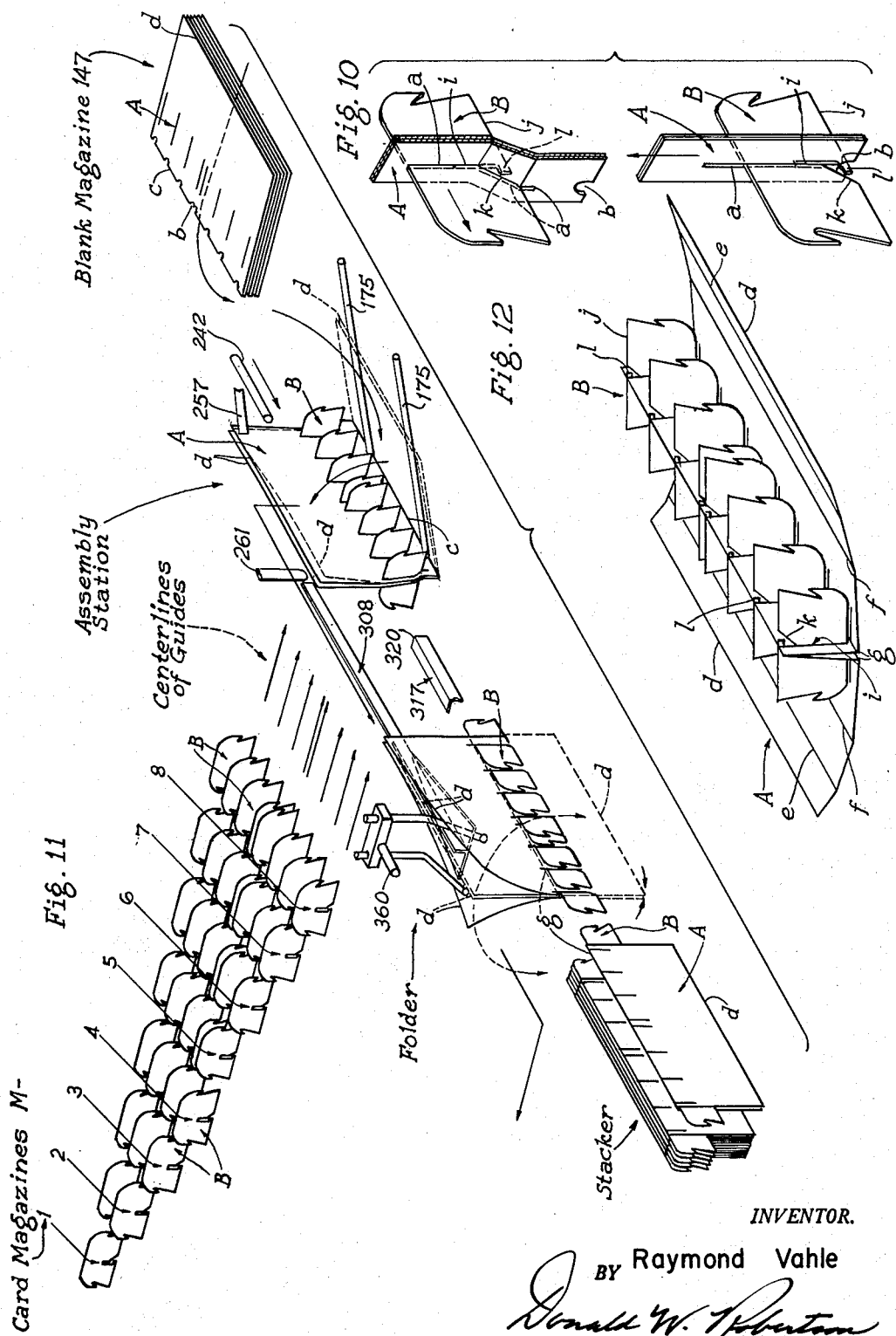

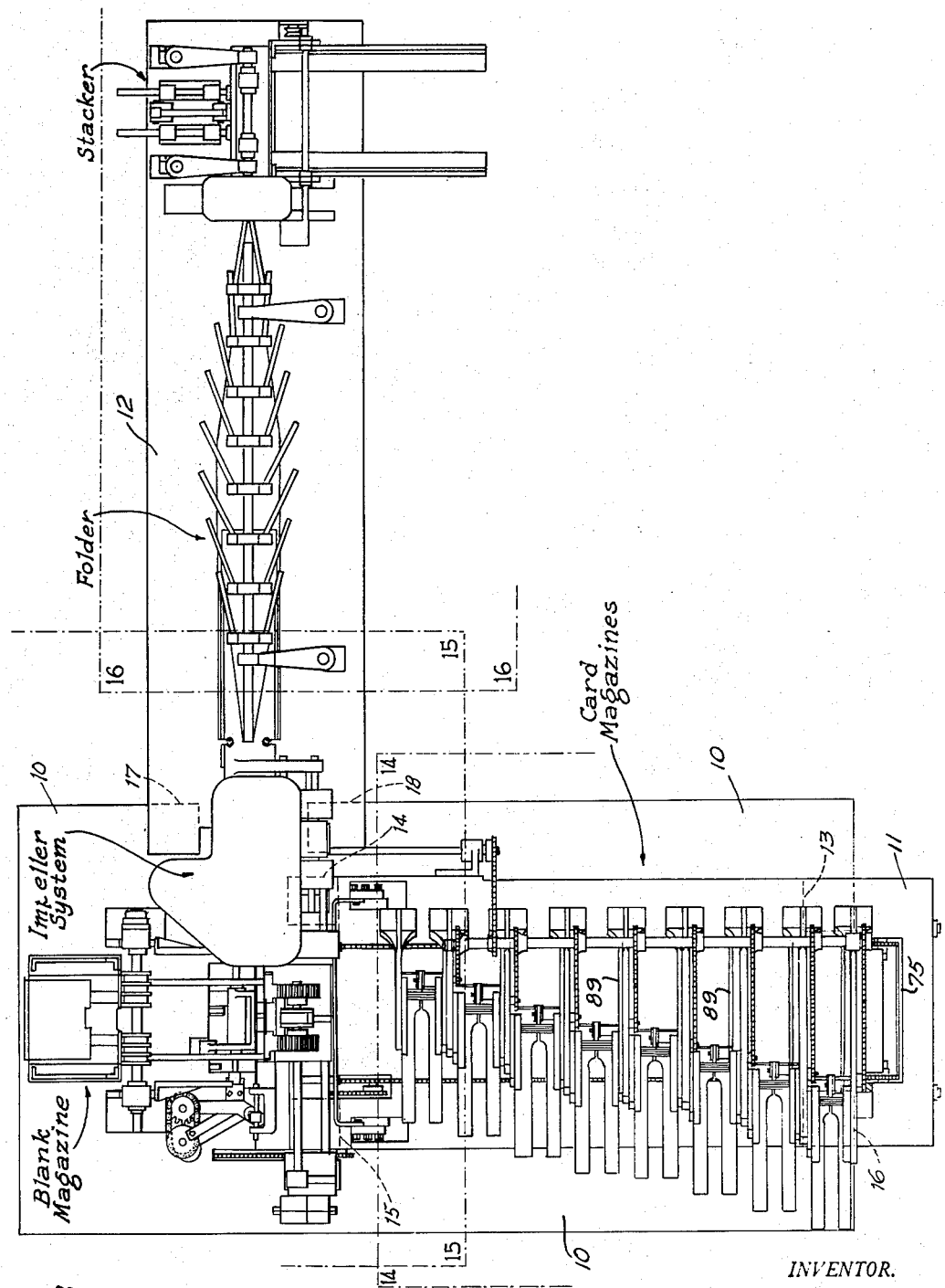

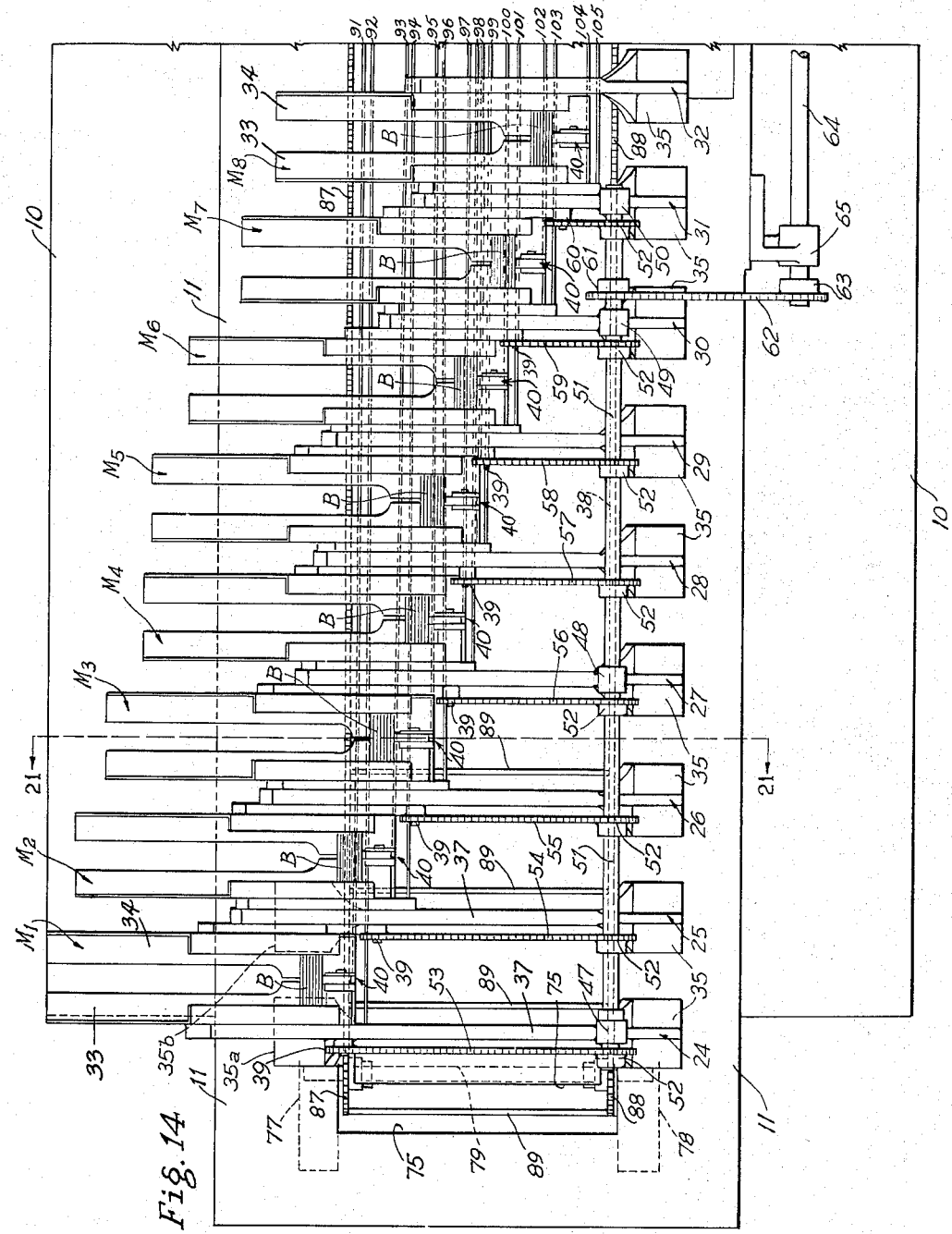

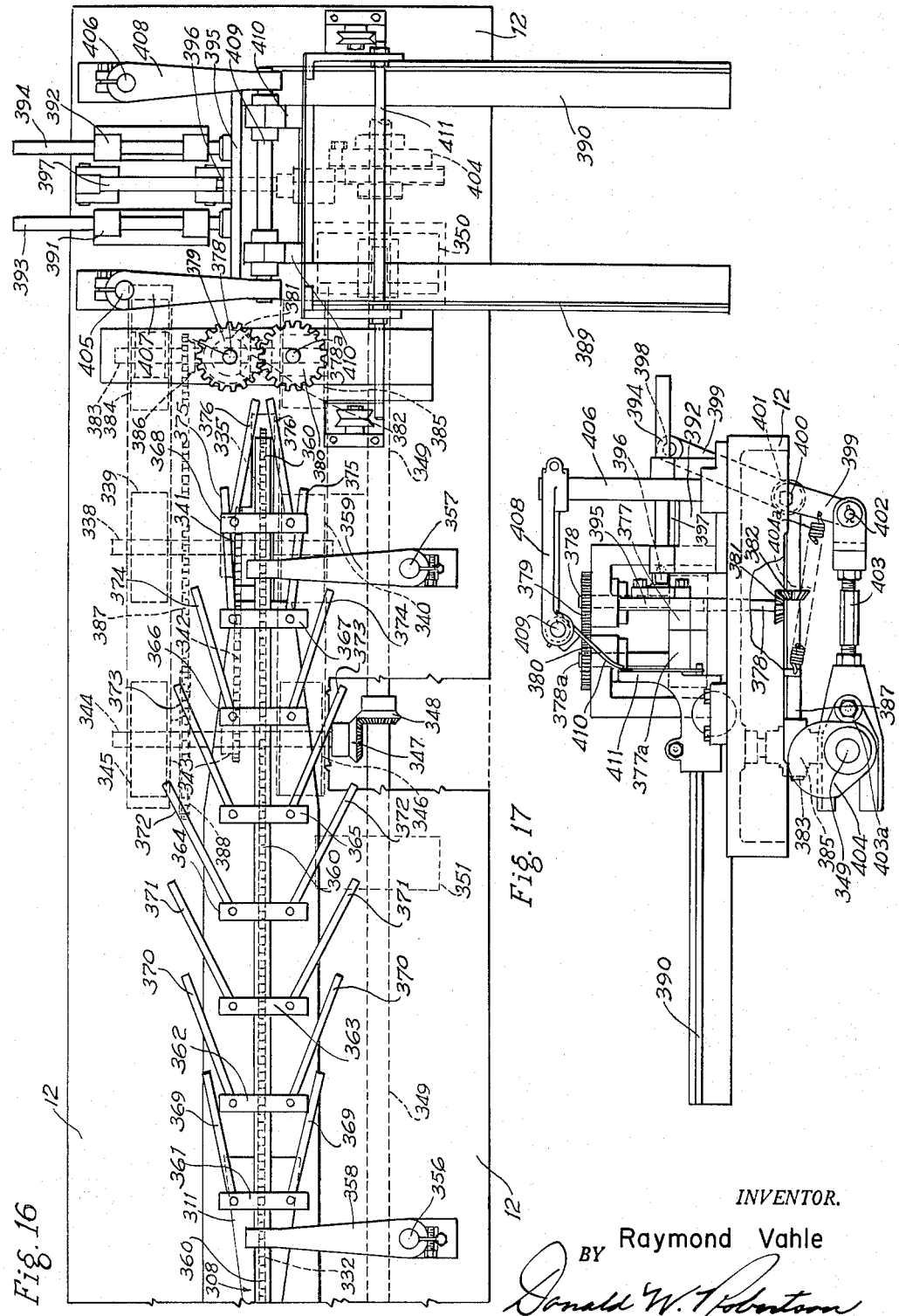

INVENTOR.
Raymond Vahle
Attorney

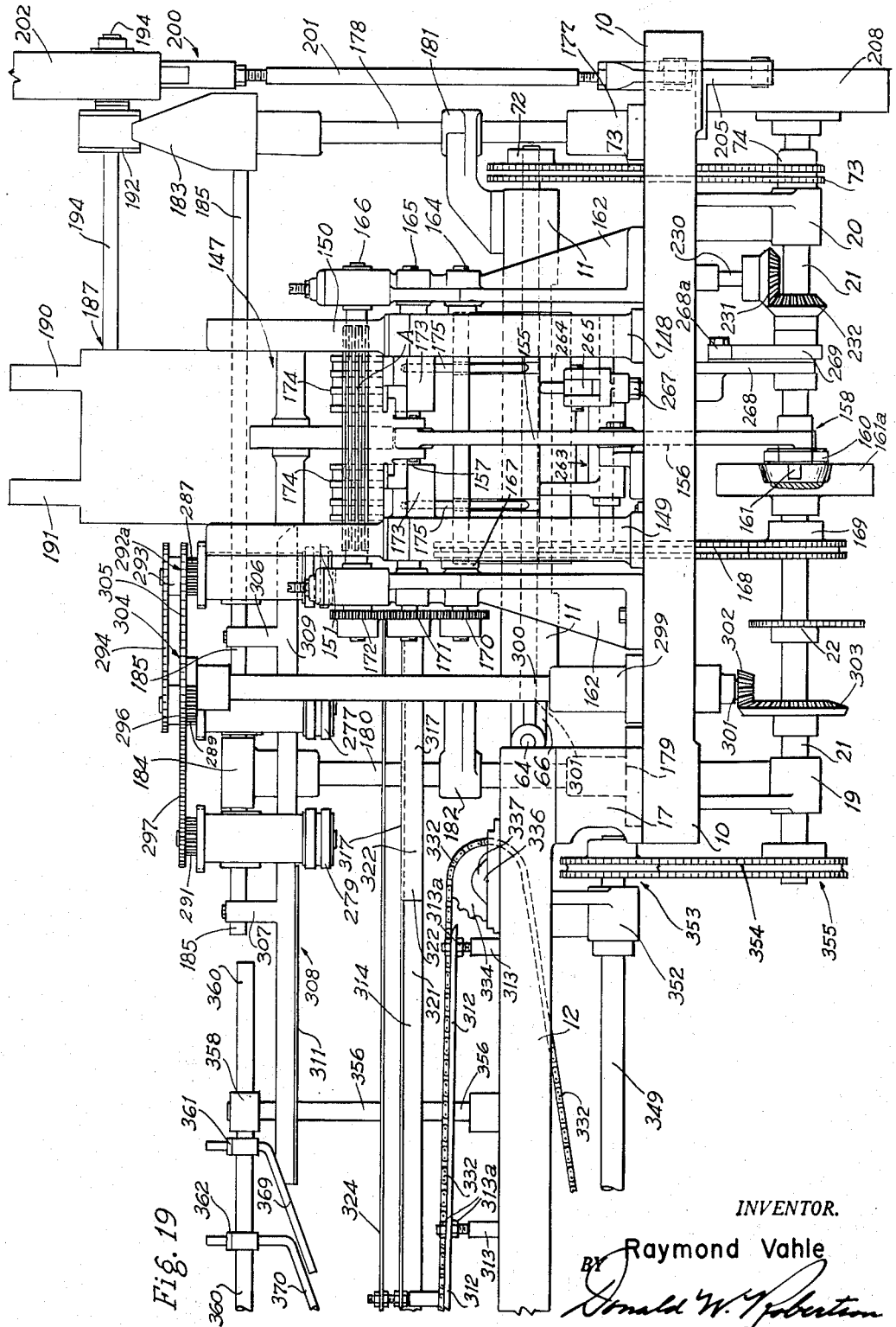

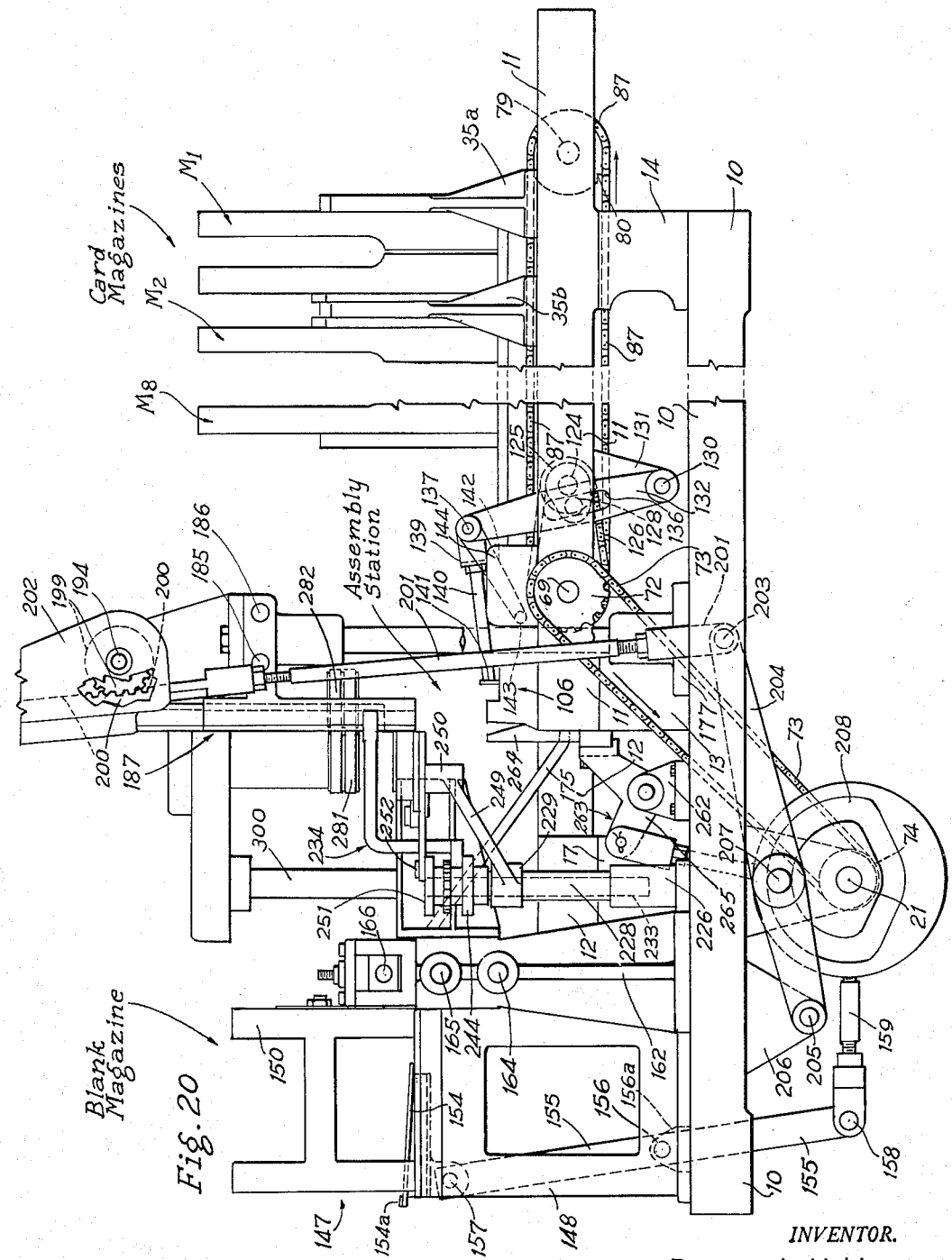

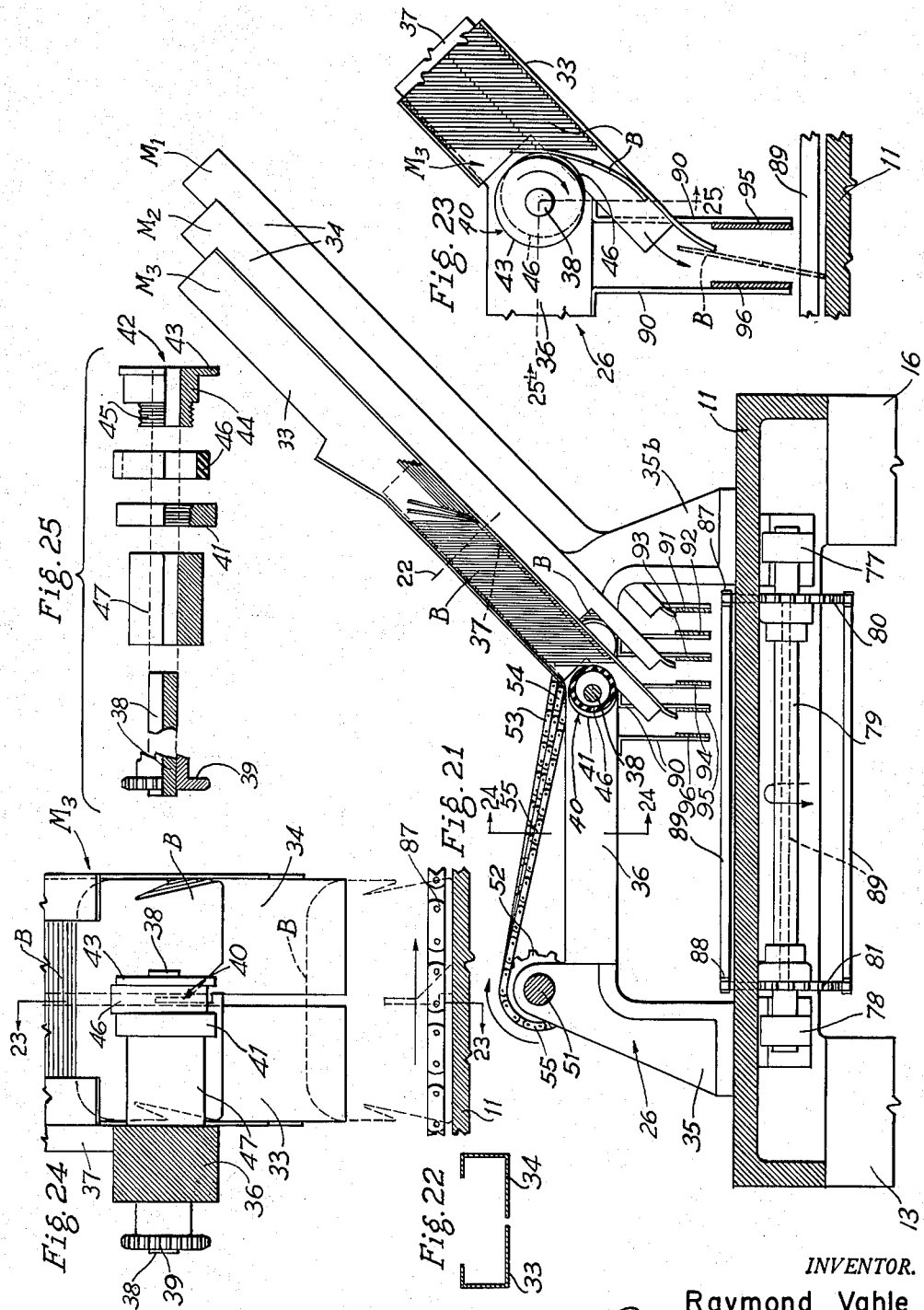

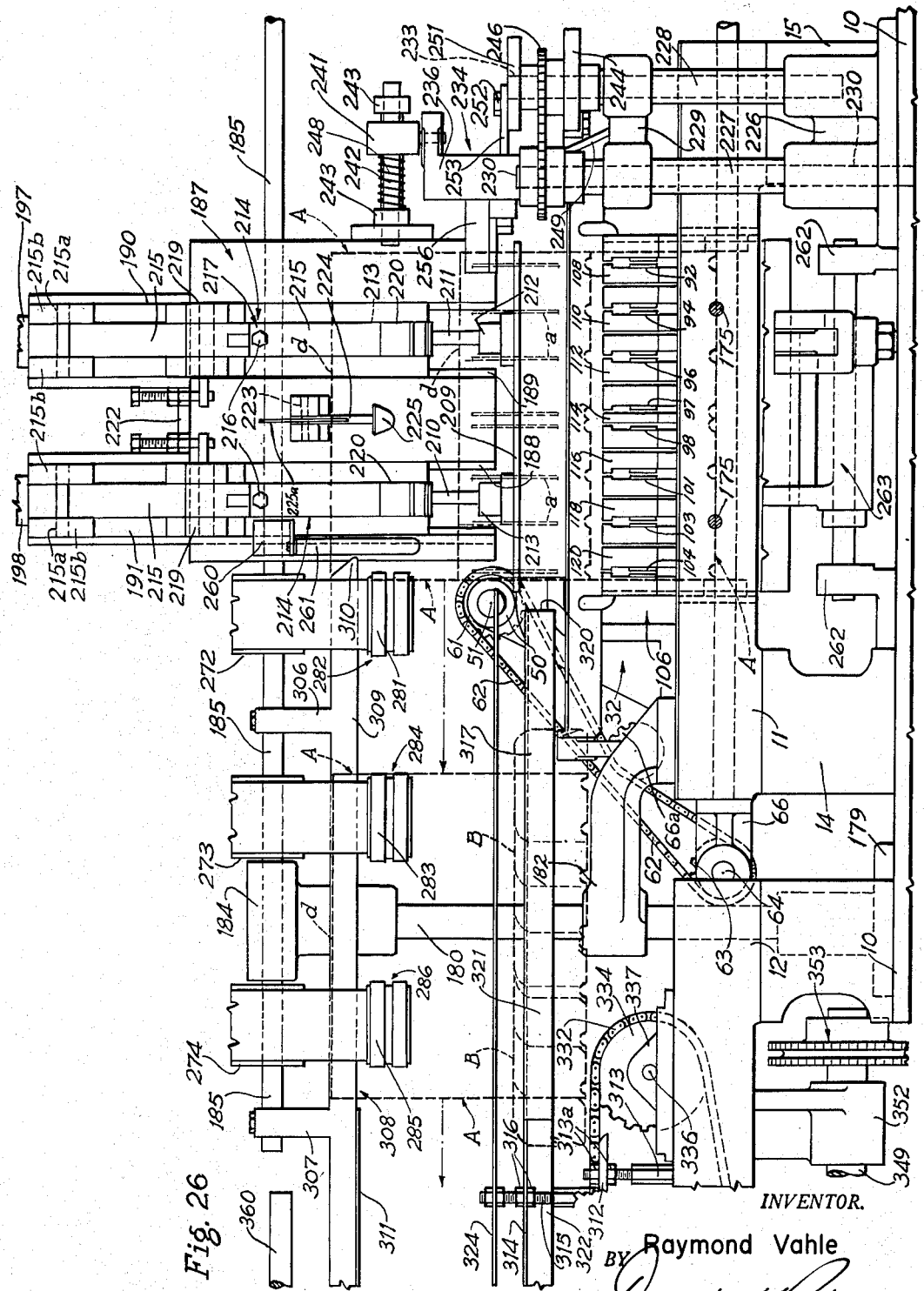

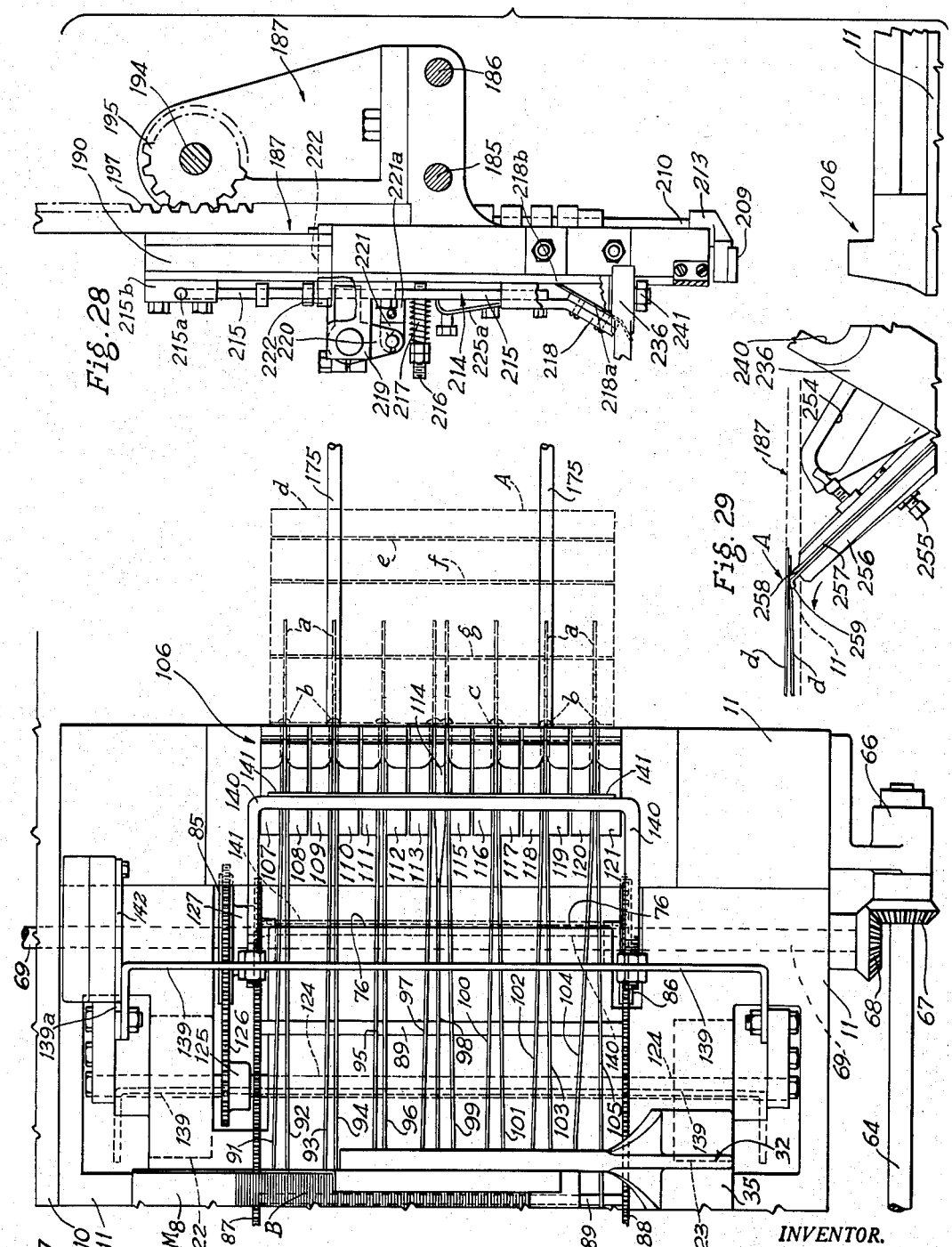
May 22, 1956 — R. VAHLE — 2,746,362
METHOD AND APPARATUS FOR ASSEMBLING CARTONS
Filed Aug. 10, 1950 — 13 Sheets-Sheet 12
INVENTOR.
Raymond Vahle
BY
Donald W. Robertson
Attorney

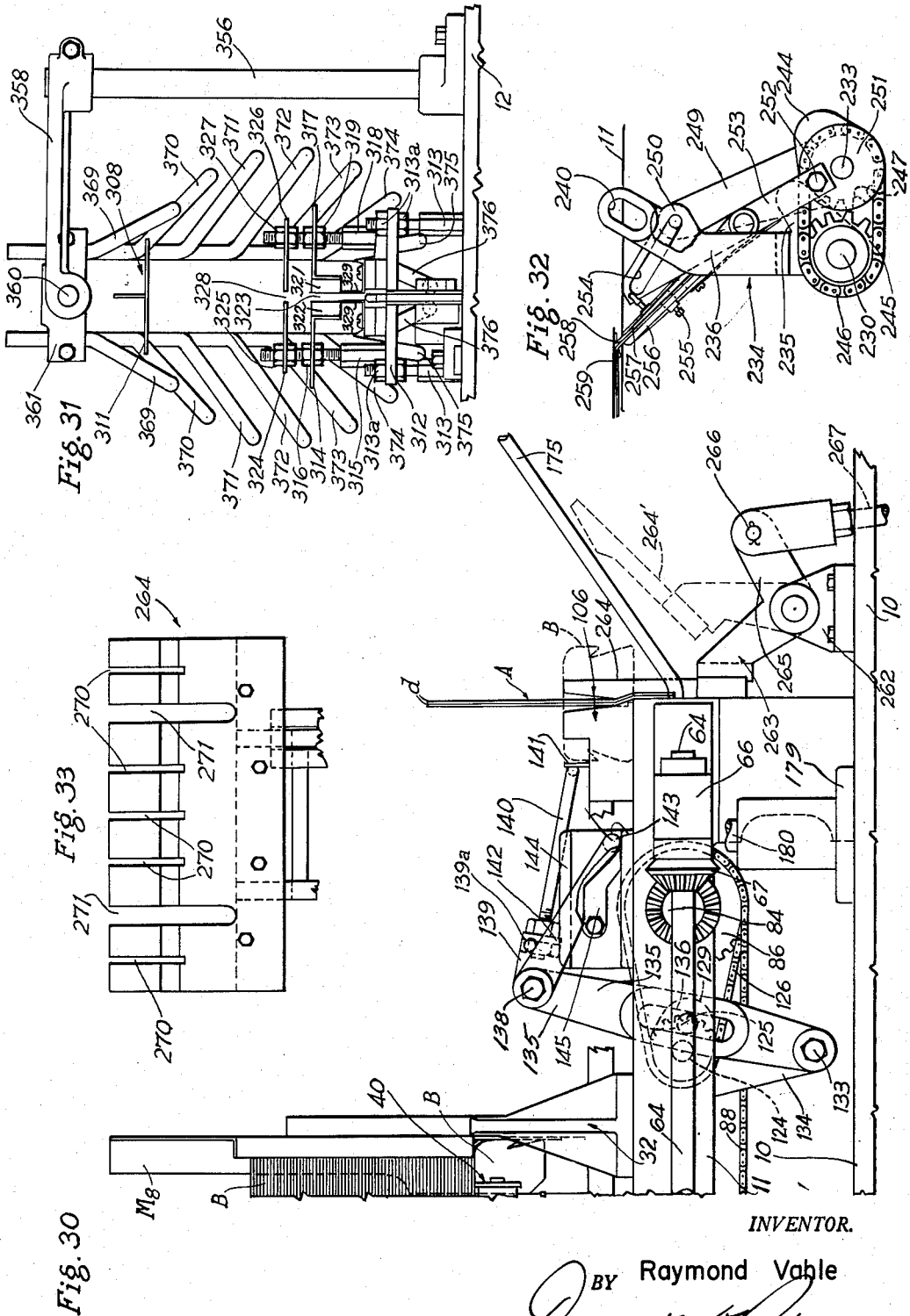

United States Patent Office 2,746,362
Patented May 22, 1956

2,746,362

METHOD AND APPARATUS FOR ASSEMBLING CARTONS

Raymond Vahle, Tappan, N. Y., assignor to Robert Gair Company, Inc., New York, N. Y., a corporation of Delaware Application August 10, 1950, Serial No. 178,566

10 Claims. (Cl. 93—37)

The invention relates to a method and apparatus for assembling paperboard egg cartons and the like. It has particular application to assembling egg cartons of the type which when set up for use provide two rows of egg compartments, the rows being separated by a folded double-walled partition the folds of which extend downwardly and outwardly and thence upwardly to form channel-like pockets, and which terminate in closure flaps which fold over the tops of the respective rows of egg compartments. The two channel-like pockets are subdivided to provide the individual egg compartments by means of cross wall blanks or partitions which extend through aligned slots in the double-walled partition element, herein referred to as the carton body blank, main carton blank, or simply as the carton blank. Thus the carton is made up of the main carton blank and a set of cross wall blanks or partitions interlocking with the main carton blank. My invention is concerned with assembling the carton and cross wall blanks to produce a finished carton blank assembly, and folding it up for shipment in compact "knocked down" form.

An egg carton of the type here described is shown in United States Patent No. 1,768,023, granted June 24, 1930, to Leon Benoit, and a method and apparatus for assembling it is disclosed in United States Patent No. 1,970,550, granted August 21, 1934, to Leon Benoit et al. Apparatus of the type disclosed in the latter patent has been used successfully for many years, and it still in use today. However, it has been found to have inherent limitations which prevent successful operation at speeds desired today for quantity production. When the operation is speeded up failures occur and the number of stoppages as well as the number of cartons which must be rejected for imperfections increases to the point that the desired speed of operation becomes unattainable in practice. Many attempts have been made over the years to improve the patented machine, and while the refinements which have been introduced have been helpful, the inherent limitations to which I have alluded have proved sufficiently serious to encourage attempts to depart more radically from certain features of operation which heretofore had seemed essential. For example, the old machine used a conventional form of blank feeder for feeding the cross wall blanks, and this necessitated the provision of elaborate mechanism for rotating the blanks from the feeding position to the erected position for being projected through the slots of the main carton blank. Also, the old machine required the use of special suction cup mechanism to handle the folding of the carton blank after insertion of the cross wall blanks. This mechanism was complex, and besides entailing considerable maintenance work, its operation was of such a nature as to require interruption of the forward movement of the blank and consequent limitation of the speed of operation of the machine.

I have found that these and other inherent limitations of the old machine can be avoided by using an entirely different scheme of blank feeding together with a new method of bringing about initial separation of the opposed walls of the medially folded main carton blank at the point of insertion of the cross wall blanks. Also, this makes it possible to bring about the initial separating action in conjunction with, and substantially coincidentally with, the step of locking the cross wall blanks into the main carton blank, thus doubling up on two of the operating steps while completely eliminating the need for the suction cup mechanism of the old machine.

In accordance with my invention several stacks of cross wall blanks and a stack of carton blanks are arranged in positions such that the planes of the cross wall blanks are substantially normal to the planes of the carton blanks and that the cross wall blanks extend in the same direction as the slots of the carton blank. The carton blanks are fed singly and each is held in its turn in assembling position. At the assembling station there is a stationary jaw and a plate for clamping a carton blank against the jaw. This plate is mounted for swinging movement to raise the incoming carton blank to vertical assembling position whereby the plate performs the dual function of raising the carton blank to vertical assembling position and clamping it for the assembling operation. Heretofore it had been considered essential to employ a reciprocatory clamping plate and a separate mechanism for raising the blank to its vertical position for clamping. Thus my mechanism eliminates the need for such a separate lifting mechanism and its associated operating mechanism. The cross wall blanks are held in magazines in which they lie substantially vertical. A feed wheel at the base of each cross wall magazine has a substantially concentric metal surface and an eccentric non-metallic or other surface for frictional engagement with the lowermost blank in the magazine to remove one blank on each revolution of the feed wheel for deposit in a guideway still in a substantially vertical position. Feeding and guiding mechanism bring the vertically arranged blanks in sets up to the assembling head of the machine. This mechanism includes a reciprocatory pusher for engagement with the rear portions of an advancing set of blanks, and a pivoted guide and a lever having an associated member arranged to pass under the pivoted guide when the pusher advances and to ride over the pivoted guide so as to pass over the tops of the next set of blanks upon its return movement. The reciprocatory pusher projects the set of cross wall blanks through slots in the carton blank as it is held in its assembling position in the head. Another reciprocatory member pushes an upper corner of one of the opposed walls of the carton blank out of line with the adjacent corner of the other of the opposed walls, creating a buckling action which slightly separates portions of the free edges of the respective opposed walls. Then lifting fingers lift the carton blank with respect to the inserted cross wall blanks, bringing the opposed walls on opposite sides of a stationary separator element and at the same time locking the cross wall blanks in place in the carton blank. After this the assembly is projected endwise from the assembling head, and as it is being conveyed to the discharge or stacking end of the machine a series of stationary folding arms cause the sides and cover portions of the carton blank to be folded downwardly. Meanwhile the cross wall blanks are guided into positions nesting approximately parallel to the adjacent slotted portions of the carton blank so that when the sides and cover portions are folded down all the way the cross wall blanks are held substantially flat inside the folded carton. Other features of my invention will appear as the description proceeds.

The component parts of the carton assembly are usually first die cut from paperboard to provide stocks of main carton blanks and cross wall blanks. Each carton assembly comprises a main carton blank and either seven or eight cross wall blanks or "cards"—the latter number of cards being used in that kind of carton which is perforated so that the filled carton may readily be broken into halves by the egg retailer as desired. The machine of the present invention, in the form illustrated herein, is adapted for making this last kind of carton; but it will readily be understood that the machine may be modified, within the scope of the invention, to make seven-card cartons, or cartons having whatever number of cross wall partitions that may be desired.

A type of feed mechanism heretofore used involves an ejector plate reciprocating beneath a vertical stack of cross wall cards held within the magazine, cards being ejected horizontally one at a time from the bottom of the stack. Usually the card magazines are arranged in a row facing the assembly station, at which the main carton blank, medially folded, is positioned vertically to receive a set of cards advancing in a rank. At the time of assembly, the cards also are required to be arranged vertically. Thus in the old type of mechanism, it is necessary to rotate each card 90° as the rank of cards advances from the magazines to the assembly station. My invention makes it possible to dispense entirely with the use of reciprocating feed mechanism for the card magazines, and likewise to dispense with the need to rotate the cards during their advance.

In the drawings:

Fig. 1 is a plan view of the main carton blank, once folded upon itself medially.

Fig. 2 is the section 2—2 of Fig. 1.

Fig. 3 shows a cross wall blank or card.

Fig. 4 is an end view of the carton blank as it appears after the cross wall blanks have been projected through its slots and before the cross wall blanks have been locked in place; and Fig. 5 is an end view of the carton assembly as it appears after the interlocking operation and before the carton has been removed from the assembly station. In these views adjacent parts of the machine are shown in dotted lines.

Fig. 6 is an end view of the carton assembly as it appears after the cross wall blanks have been fanned against the carton blank.

Fig. 7 is a plan view of the carton assembly as it appears after the cross wall blanks have been fanned. Here, the top edges of the blank are shown close together to keep from obscuring the fanned cards. Actually the free edges of the blanks are, at this stage, separated as shown in Figs. 5 and 6.

Fig. 8 is an end view, and Fig. 9 a side view, of the carton assembly as it appears after the panels of the carton blank have been folded over the nested cross wall blanks in the manner indicated in dotted lines to complete assembly and folding of the carton for shipment in compact "knocked down" form.

Fig. 10, the two elements of which are bracketed, illustrates the interlocking operation.

Fig. 11 is a diagrammatic perspective view illustrating the method.

Fig. 12 is a perspective view of the completed carton, showing the inside thereof, as it appears when opened preparatory to setting it up as a container for eggs.

Fig. 13 is a general plan view of the machine.

Fig. 14 is an enlarged plan view of parts enclosed within the area indexed 14 in Fig. 13.

Figure 15:
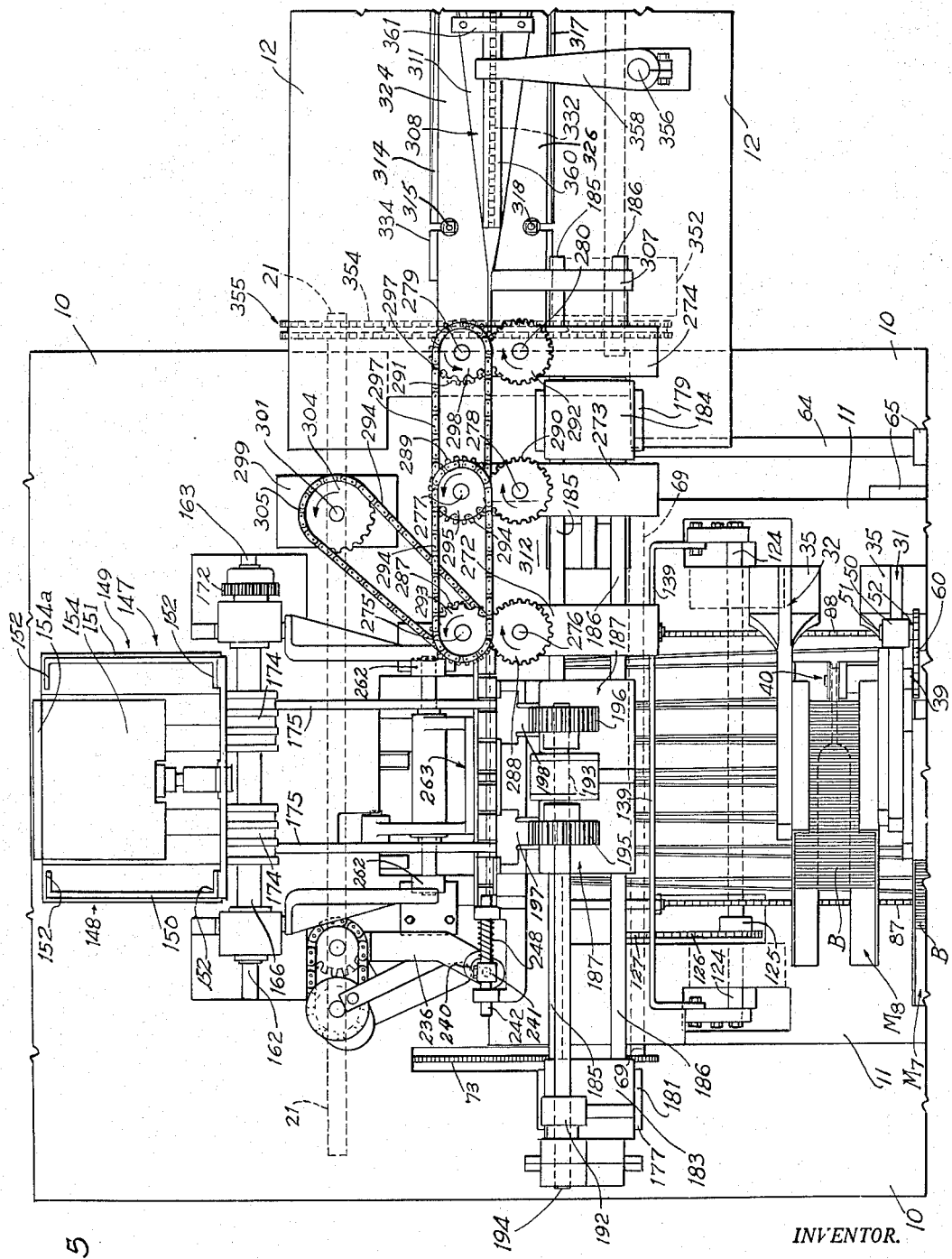

Fig. 15 is an enlarged plan view of parts enclosed within the area indexed 15 in Fig. 13.

Fig. 16 is an enlarged plan view of parts enclosed within the area indexed 16 in Fig. 13.

Fig. 17 is a partial right side (right side of Fig. 13) elevational view of the machine, showing the mechanism for stacking the completely assembled and folded cartons.

Figure 18:
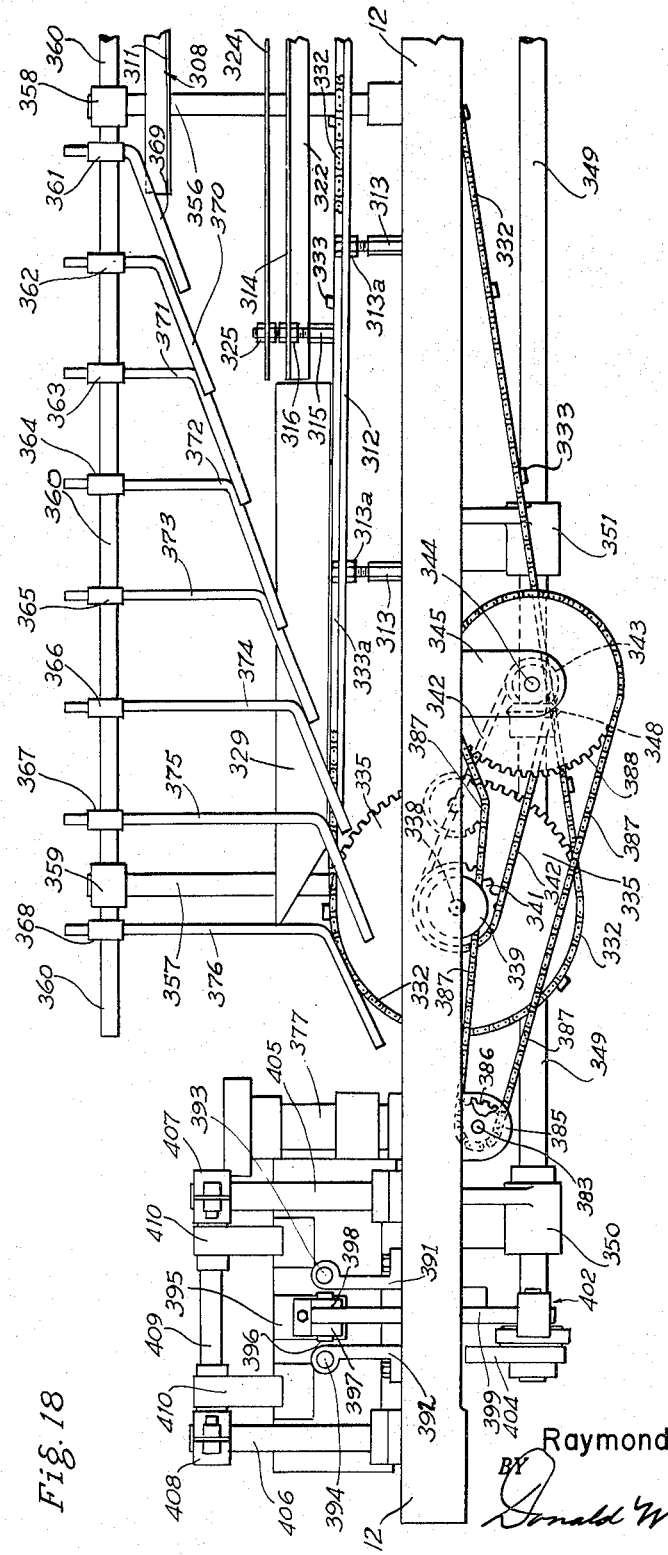

Figs. 18 and 19 together form a front elevational view of the entire machine, details of the mechanism at the assembly station being omitted.

Fig. 20 is a left side elevational view, with portions broken away to condense the view.

Fig. 21 is the vertical section 21—21 of Fig. 14.

Fig. 22 is a cross section of the lower part of a card magazine. (See broken line 22, Fig. 21.)

Fig. 23 is a detail view of the lower part of a typical card magazine and its feed mechanism taken as indicated at 23—23 in Fig. 24.

Fig. 24 is a right side elevational detail of the same, partly in vertical section on the line 24—24 of Fig. 21.

Fig. 25 is an exploded view of parts of a typical card feed mechanism.

Fig. 26 is a fragmentary front elevational view of the right end of the machine with the blank feeding mechanism and other parts removed to afford a clear view of the assembly station.

Fig. 27 is a plan view of the assembly station with certain parts removed.

Fig. 28 is a much enlarged elevational view of means for raising the blank at the assembly station.

Fig. 29 is a much enlarged plan view of means for separating the free edges of the opposed walls of the carton blank.

Fig. 30 is a right side elevational view of the assembly station, with many parts omitted for clarity.

Fig. 31 is a left side elevational view of the folder.

Fig. 32 is an enlarged plan view of the means for separating the free edges of the opposed walls of the carton blank and for pushing the carton blank assembly endwise to start its removal from the assembly station.

Fig. 33 is an elevational view of the carton blank raising and clamping plate.

The carton

It is to be understood that I claim no invention in the carton itself, nor in the general plan of its assembly in flat folded form. However, a brief description of the carton and its general plan of assembly will be helpful to an understanding of my invention, and here follows:

A typical flat-folded egg carton is shown complete in Figs. 8 and 9, respectively an end and a side view. When the carton is opened preparatory to setting it up as a container for eggs it appears as shown in Fig. 12. This type of carton, preferably made of paperboard, comprises a main body blank having interlocked therewith a number of partition-forming cross wall blanks, or cards, and may be shipped flat. Some cartons of this type, adapted to be broken into halves when filled with eggs, are provided with eight cards, two of which are arranged closely together at the center, one at each side of a perforated line of separation; others have only seven cards. The first kind has been adopted herein for purposes of illustration. Accordingly, the machine is shown arranged to produce this kind of carton. Subsequently, slight modifications of the machine adapting it for seven-card cartons will be discussed.

The main carton blank is, originally, a rectangular sheet, but, as introduced to the machine, has been folded once medially so as to have two opposed walls, or panels overlying one another. Fig. 1 shows the blank A, ready for the machine. Both panels are provided with registered series of slots $a$. A series of notches $b$, aligned with said slots, is provided along the arris $c$ of the fold. The free edges of the blank opposite the fold are designated $d$. Registered scores $e$, $f$, and $g$ are provided on both panels. The panels are perforated in registration along line $h$.

Fig. 2 shows the fold slightly open so that the two panels may be clearly distinguished, and to illustrate the registration of the scores; but it will be understood that the panels are in contact when the blank is put in the machine. The scores $e$, $f$, and $g$ are purposely exaggerated in Fig. 2. In other figures in which both panels are seen the scores are generally omitted altogether for simplicity of illustration.

Fig. 3 shows a typical cross wall blank or card B. Here the arrow indicates the direction in which a card is presented to the blank. The card is provided with a slot $i$ extending upward from the base edge $j$. The mouth of the slot is beveled at $k$, and opposite the bevel is a small locking tongue $l$. The height of slots $a$ of the carton blank is greater than that of the cards. The width of the slots is greater than the thickness of the cards by an amount sufficient to permit easy fanning and flattening of the cards against the panels of the carton blank.

The carton is assembled in the following general manner (detailed description of the particular features of novelty of my invention to follow later):

The folded carton blank is delivered first to an assembly station. There it is vertically positioned and firmly held, with the fold at the bottom and with a longitudinal band parallel and near the fold slightly crimped, as shown in Fig. 4. A set of eight cards, disposed vertically and with their edges $j$ at the bottom, is advanced in a rank to the assembly station in a direction normal to the blank (from right to left as viewed in Fig. 4). The common level of the tops of the cards is substantially that of the upper edges of the slots $a$ of the blank, with which slots the cards are aligned. See Figs. 4 and 27; compare, also, Fig. 26. The leading edges of the cards pass through the slots and the advancing movement continues until slots $i$ are registered with the plane of the carton blank. The cards are then held against vertical movement, and the blank is released for such movement and is raised. As the slightly offset margin of the blank near the fold moves upwardly the lower edges of slots $a$ presently strike the bevels at $k$, which guide such offset portion into slots $i$. This portion is brought back into the general plane of the blank, and presently the notches $b$ are brought opposite the locking tongues $l$ whereupon the lower edge of the blank snaps into such plane completely. At this stage the blank and cards are interlocked. Immediately thereafter the cards are released for vertical movement, and the carton assembly is raised as a unit to the position shown in Fig. 5—for now the lower edges of slots $a$ will be in contact with the ends of slots $i$. When the carton blank is raised, the edges $d$ of the blank are slightly separated, as shown in the last named figure, in preparation for a folding operation. At this stage the cards merely hang in slots $a$ of the blank. The cards are next fanned, as shown in Figs. 6 and 7, so that they lie nearly flat against the panels of the blank. Then the panels are held together along scores $g$, and that portion of each panel above the score is rotated substantially 180°, as shown in Fig. 8, on the score as a center. The flat-folded carton assembly is now complete, and, as seen in the side view of Fig. 9, these portions of the panels overlie the nested cards and hold them flat during handling and shipping.

The machine in general

A plan of the entire machine is shown in Fig. 13. This view furnishes an index to Figs. 14, 15 and 16, which, together, form an enlarged detail plan of the machine. Figs. 18 and 19 together form a front elevational view on the scale of the enlarged plan mentioned above. Fig. 20 is a left side elevational view. These figures best illustrate the general descriptive matter immediately following.

In Fig. 13 it is seen that the main frame of the machine is roughly L-shaped. The main frame comprises three separate rectangular platforms 10, 11, and 12, which are rigidly joined together. Each platform is preferably a casting having a planed upper surface. Platform 10 is adapted to be provided at its four corners with suitable legs, not shown. Platform 11, longitudinally aligned with platform 10, is supported at its four corners by pedestals 13, 14, 15, and 16 mounted on the upper surface of the last named platform. Platform 12, normal to platforms 10 and 11, is supported at each corner of one of its ends by two like pedestals 17 and 18 (dotted lines in Figs. 13, 15; see, also, Fig. 19) mounted on the upper surface of platform 10 on its right side near the front. The other end of platform 12 may be supported by legs, not shown. The level of the planed upper surfaces of platforms 11 and 12 is common; that of the planed upper surface of platform 10 is lower by the thickness of platforms 11 and 12 and the common height of all pedestals mentioned above. Journaled in hangers 19 and 20 (Fig. 19) beneath platform 10 is a main drive shaft 21 having mounted thereon a sprocket 22 connected by a chain to a suitable motor, not shown. (All moving parts of the machine are driven by transmission means connected with the main shaft 21.)

For the purposes of the following detailed description the machine will be considered in separate sections. These are:

(1) The mechanism for storing cross wall blanks and for feeding them to the assembly station.

(2) The mechanism for storing main carton blanks and for feeding them to the assembly station.

(3) The assembly station.

(4) The mechanism for folding the assembled blanks.

(5) The stacker.

Referring to Fig. 13, the general locations of these parts are as follows: The feed mechanism for the cross wall blanks is mounted on platform 11; the feed mechanism for the carton blanks is mounted at the front center of platform 10; the assembly station at the front end of platform 11; the folder extends from the assembly station toward the right and is mounted on platform 12; and the stacker is mounted on the right extremity of platform 12.

The card feed

Supported over platform 11 by means of nine pedestals 24 through 32 mounted thereon is a staggered series of eight like card magazines M1 through M8 arranged longitudinally of the platform. Each magazine is adapted to carry a number of stacked cards; and each magazine is provided with a feed mechanism arranged to operate continuously in one direction and to deliver cards, one after another, so that they fall onto the platform on edge substantially in a vertical plane. This is one of the important features of my invention.

Figs. 14 and 21 illustrate the magazines. Each magazine in the construction specifically shown comprises two oppositely disposed chute-forming members 33 and 34, each preferably of folded sheet metal and each being other hand to its companion. These members are secured in alignment with each other between a pair of pedestals. Each magazine is, in effect, a slanting chute; see Fig. 21, whose plane passes through the longitudinal median line of magazine M3. Note, particularly in Fig. 23, that the cards within a magazine are slightly fanned, so that the cards are disposed substantially vertically on edge. The cards feed down by gravity as one after another is removed from the lower end of the magazine; and from time to time, as required, the magazine load is replenished by hand.

Each pedestal 24 through 32 is provided with one of a series of footings 35 aligned with and near one longitudinal edge of platform 11, said footings being rigidly secured to the platform. The nine pedestals are all slightly different. Pedestals 26 through 32 are cantilevers; pedestals 24 and 25 are not, and are each provided with an extra footing opposite footing 35, these extra footings being 35a and 35b respectively. Each pedestal is provided with a horizontal portion extending from footing 35 transversely over platform 11; for example, horizontal portion 36 of pedestal 26, as shown in Fig. 21. These horizontal portions are of different lengths due to the staggered arrangement of the magazines. At the end of each such horizontal portion opposite footing 35 is a rigid upwardly slanting arm, such as arm 37 of pedestal 26, shown in dotted lines in Fig. 21. All such arms are alike. The chute-forming members 33 and 34 of the magazines are secured between adjacent arms. See Figs. 14 and 21.

The eight card feed mechanisms may be alike. That mechanism relating to magazine M3 is illustrated in detail in Figs. 21, 23, 24, and 25. Journaled in the horizontal portion of the pedestals, except 32, is a shaft 38 upon which the feed mechanism is mounted (Fig. 14). With particular reference to the feed mechanism relating to magazine M3, it will be seen in Fig. 24 that, on the left of portion 36, a sprocket 39 is mounted on shaft 38. On the right side of portion 36 the shaft 38 passes beyond the wall of member 33 of the magazine, and, within the magazine, a feed wheel indicated generally at 40 is mounted on the shaft approximately in the center of the lower portion of the magazine.

The construction of feed wheels 40 is best illustrated in Fig. 25. Each wheel comprises two portions, a centrally perforate and threaded disc 41 and a portion 42 having a flange 43 of equal diameter and coaxial with said disc, and also having an eccentric boss 44 adjacent said flange and a threaded boss 45 at the end of boss 44 opposite said flange, said boss 45 being coaxial with said flange and adapted to be screwed into the threaded central perforation of disc 41. The disc 41 and portion 42 are preferably of steel, and the peripheries of the disc and of the flange are desirably highly polished. The wheel may be keyed to shaft 38 in any suitable manner. As of Fig. 24, between the right-hand side of the related horizontal portion (36) and the left-hand side of disc 41 is a suitable spacer 47. Fitted snugly over boss 44 is an annular sleeve 46, preferably of rubber, having such wall thickness that a sector of its outer surface is radially more distant from the center of the shaft 38 than the peripheries of disc 41 and flange 43. If desired, disc 41 and portion 42 may be made integral.

In Fig. 23 the lowermost card is shown in process of being ejected from the magazine. The feed wheel 40 is located in the path of the descending stack of cards so as to prevent the stack, as a whole, from falling out of the magazine. As the wheel is rotated in the direction indicated by the arrow, the polished surfaces of disc 41 and flange 43, slide freely over the surface of the lowermost card, but as continued rotation of the wheel brings the high sector of sleeve 46 into contact with the card the frictional drag of the rubber against the paperboard is sufficient to feed the card as here illustrated. Presently contact between the high sector of the sleeve and the card is broken and the card falls out of the magazine substantially vertically on edge onto platform 11, as indicated by dotted lines, between guides 95, 96.

The similar feed wheels 40 of the eight magazines are indexed so that the high sectors of all sleeves 46 are in line. Thus when shafts 38 are rotated in unison the cards will be delivered from all magazines at the same instant. The eccentric arrangement of sleeves 46 produces a particularly smooth and positive feeding action which is of special importance, because if any one of the eight cards to be fed simultaneously is not removed from its magazine, it will be realized that the resulting carton is worthless. My feed wheel construction will be understood to comprise, in its general arrangement, a substantially concentric metal surface (the surface of disc 41) and an eccentric non-metallic surface (the surface of sleeve 46) adjacent thereto for frictional engagement with the lowermost card, or blank, in the magazine to remove one blank on each revolution of the feed wheel. The eccentric non-metallic surface provides a high spot contacting the lowermost blank on each revolution. In the specific form illustrated, the eccentric sleeve 46 is arranged between two circular concentric metal parts 41 and 43.

It is seen in Fig. 14 that pedestals 24, 27, 30, and 31 are respectively provided with aligned bearings 47, 48, 49, and 50 for a shaft 51 disposed longitudinally with respect to platform 11. Fixed on shaft 51 are a series of eight aligned sprockets 52 respectively connected by chains 53 through 60 with the sprockets 39. Also fixed on shaft 51 between pedestals 30 and 31 is another sprocket 61 connected by a chain 62 with a sprocket 63 mounted on a shaft 64 journaled in bearings 65 and 66 mounted on the side of platform 11. Mounted on shaft 64 adjacent bearing 66 is a bevel gear 67 meshing with another bevel gear 68 mounted on a shaft 69 journaled in hangers secured beneath platform 11. As seen in Fig. 27, shaft 69 is disposed at right angles to the longitudinal axis of platform 11. Mounted on shaft 69 as shown in Fig. 20, is a sprocket 72 connected by chains 73 with a sprocket 74 on the main shaft 21 (Figs. 15, 13 and 19). The several feed wheels 40 thus are driven from shaft 21.

The platform 11 has a slot 75 near its rear end and a slot 76 near its front end (Figs. 13, 14 and 27). Journaled in hangers 77 and 78 (Fig. 21) beneath the platform near slot 75 is a transverse shaft 79. Mounted on shaft 79 are two sprockets 80, 81 (Fig. 20). Mounted on shaft 69 journaled in hangers beneath the platform near slot 76 are two sprockets 85 and 86, the first aligned with sprocket 80 and the second with sprocket 81. Sprockets 80 and 85 are connected with a chain 87, and sprockets 81 and 86 are similarly connected with a chain 88. The upper parts of chains 87 and 88 extend over the upper surface of platform 11. The two chains are cross-connected by a series of spaced rods 89 (Fig. 13) which engage the cards to advance them in successive ranks from the magazines to the assembly station, a system of guides being provided to hold the cards substantially vertical during their travel. The distance between adjacent members 89 equals the distance between the centerlines of adjacent magazines. The advance of members 89 is so timed with the delivery of cards from the magazines that cards fall to platform 11 between the members 89.

The card guides are supported above the conveying means. Each guide comprises a pair of rails, spaced well apart near the particular magazine (e. g., 95 and 96 in Figs. 21 and 23) and converging toward the assembly station. At the front end of platform 11 the rails of any one guide are separated only by the measure of the thickness of a card, plus a small tolerance. The rails preferably are supported by brackets extending downwardly from the pedestals. Several such brackets, designated generally 90, are seen in Fig. 21. Rails 91 and 92 form the guide for magazine M1; 93 and 94 for M2; 95 and 96 for M3. Rail 97, the middle rail 98, and rail 99 form the guides for magazines M4 and M5. Rails 100 and 101 form the guide for magazine M6; 102 and 103 for M7; 104 and 105 for M8. See Figs. 14 and 27.

At the center of the front of platform 11 is a composite structure, designated in its entirety 106, comprising a series of blocks 107 through 121, rigidly mounted, and having their front edges registered with the front edge of the platform (Fig. 27). These blocks serve, in one capacity, as anchors for the front ends of the guide rails. The manner in which the blocks are channeled to receive the ends of the rails is best shown in Fig. 26. Rails 91 through 105 are securely anchored to blocks 107 through 121 respectively. Note, in Fig. 27, that the middle rail 98, expands at structure 106 to conform to middle block 114. A set of cards advancing through the several guides is laterally spaced exactly to accord with the slots *a* of the blank by the time the cards reach the front end of platform 11. The structure 106 is a part of the assembly station, and will be more particularly described under that heading.

Journaled beneath the forward part of platform 11 in hangers 122 and 123 is a transverse shaft 124 having mounted thereon a sprocket 125 connected by a chain 126 within another sprocket 127 mounted on shaft 69. At the opposite ends of shaft 124 are cranks 128, 129 (Figs. 20, 30). Pivotally mounted at 130 on a bracket 131 secured beneath the left side of platform 11 is a pitman 132 (Fig. 20). Pivotally mounted at 133 on another bracket 134 secured beneath the right side of platform 11 is another pitman 135 (Fig. 30). The pivotal mountings of the two pitmans are coaxial, and the pitmans are arranged to work in unison. Each pitman has a slot 136. Crank 128 coacts with the slot of pitman 132; crank 129 with that of pitman 135. As shaft 124 is rotated, the cranks oscillate the pitmans. Pivotally mounted on pitmans 132 and 135 at 137 and 138 respectively is a yoke 139 (Fig. 27). Rigidly fixed to yoke 139 is another yoke 140 extending forwardly thereof. On the front of yoke 140 is a reciprocatory pusher plate 141 adapted to engage the rear edges of all cards of an advancing rank and push them forward at an accelerated speed in relation to that of the conveying means previously described, and to project the cards into slots between the blocks of structure 106. Pivotally attached to yoke 139 is a lever arm 142, for engagement with lug 139a on yoke 139 to lift the yoke. Mounted on the outside of the end of arm 142 is a cam roller 143. Within a box 144, as seen in Fig. 30, is a pivotally mounted cam or guide 145. As the pitmans operate to move pusher plate 141 forward, arm 142 and roller 143, through the aforesaid engagement of arm 142 with lug 139a, support the pusher plate just above the tops of the guide rails and in engagement with the rear edges of a set of cards. The extreme forward throw of the pitmans brings the pusher plate into the position of Fig. 30 with the cards projected through the slots of the carton blank. The structure described provides means for elevating the pusher to pass over the tops of the next set of cards upon its return movement. The elevating means comprises pivoted guide 145 and a lever (arm 142 in conjunction with yokes 139 and 140) having an associated member (roller 143) arranged to pass under the pivoted guide when the pusher advances and to ride over the top of the pivoted guide as the pusher returns to its starting position. Thus, in its forward movement roller 143 pushes underneath pivoted guide 145, raising the latter. When the roller has passed the forward end of guide 145, the guide drops back to its original position. On the return movement, roller 143 rides over the top of the guide to finally drop behind it as the parts reach their initial position ready for the pusher to engage another set of cards for the succeeding cycle of operation.

*The carton blank feed*

Mounted in the center of the front part of platform 10 is a magazine and feed mechanism for blanks. Comprehensive views of these structures are had in Fig. 15, a plan; Fig. 19, a front elevation; and Fig. 20, a left side elevation.

The blank magazine 147 is supported by frames 148, 149, fixed to platform 10. The magazine comprises a box-like structure formed by frames 150, 151, each having flanges 152 to confine a stack of blanks within the magazine and to guide the stack as it descends—the feed being from the bottom of the stack. Blanks are loaded into the magazine from above in usual manner; and the feed here employed involves a reciprocating ejector plate of a type well known in the art. Blanks are arranged in the magazine so that the folds are toward the assembly station of the machine, on a reciprocatory ejector plate 154 having at its front edge a strip 154a. The strip extends from side to side of the ejector plate, and its height is approximately equal to the thickness of one blank. The ejector plate 154 is actuated by a lever 155 having a fulcrum at 156, the upper end of the lever being pivotally attached to the plate at 157. The lower end of the lever 155 is pivotally attached at 158 to a connecting rod 159, which is adjustable in length, as shown, and which has a yoke 160 engaging main shaft 21, yoke 160 having a roller 161 thereon engaging a conventional box cam 161a (similar to box cam 208, Fig. 20) mounted on shaft 21. When the ejector plate 154 moves to the right as viewed in Fig. 20, strip 154a engages the lowermost blank in the magazine and drives it partly out of the magazine beneath the flanges 152 of frames 150, 151. Journaled in oppositely disposed standards 162 and 163 mounted on platform 10 to the left and right of the pillars 148 and 149 as shown in Fig. 15 are three horizontal shafts, one above the other, designated 164, 165 and 166. Mounted on shaft 164 is a double sprocket 167 connected by a double chain 168 with another double sprocket 169 mounted on the main shaft 21. To the left, as in Fig. 19, the shafts 164, 165, and 166 are provided, respectively, with gears 170, 171, and 172, enmeshed in train, as shown, whereby the intermediate shaft 165 is rotated in a direction opposite to that of main shaft 21 and shaft 164, so as to rotate shaft 166 in the same direction as shafts 21 and 164. Mounted on shafts 165 and 166 are a pair of feed rollers 173 cooperating with another pair of feed rollers 174. Shafts 165 and 166 are at such levels that the pass between the cooperating feed rollers 173 and 174 is in the plane of the advanced edge of a partially ejected blank. Upon operation of the ejector plate 154 to initiate the delivery of the lowermost blank, the edge of the blank is caught between the feed rollers, and the blank is then snatched completely out of the magazine and ejected beyond the rollers. In usual manner the ejector plate is returned to normal position, and, as the strip 154a is carried from beneath the remainder of the stack, the other blanks drop to the bottom of the magazine.

Slanting downwardly from the blank magazine 147 to the front end of platform 11 are two bars 175 (Figs. 15, 20 and 27). In sequence, the ejected folded blanks slide down these slanting bars, fold first, against the front of platform 11. It will be seen in Fig. 27 that the bars are spaced apart by a distance equal to that between notch b second from one end, and notch b second from the other end, of a blank. As the bars are bent near the front end of platform 11 to enter the face of the same horizontally, these two notches b operate as means for settling the blank in proper registration with structure 106 at the assembly station, as shown in Fig. 26. The blank comes to rest when the fold thereof strikes the face of platform 11, and lies on the bars 175 until raised into a vertical position, as will be discussed in a description of the assembly station, which follows.

*The assembly station*

Broadly, the mechanism directly involved in introducing a set of cards into the slots of the carton blank and in locking the cards therein may be regarded as part of the assembly station.

Mounted in a footing 177 based on platform 10 near the front end of platform 11 and slightly to the left thereof is a standard 178. See Figs. 19 and 20. Opposite this standard, beyond the other side of platform 11, and mounted in a footing 179 also based on platform 10, is another standard 180. See Figs. 19, 26, and 30. The two standards support a relatively heavy structure carrying vertically reciprocating parts and are required to be of considerable rigidity. For this reason both standards are braced by brackets mounted on the sides of platform 11, as best seen in Fig. 19. Bracket 181 relates to standard 178; bracket 182 to standard 180. Standards 178 and 180 are capped, respectively, by members 183 and 184, both preferably castings. The members 183 and 184 are rigidly tied together by two rods 185 and 186 transversely disposed with respect to platform 11 over which they extend at a considerable height thereabove. Rods 185 and 186 lie in a common horizontal plane. Mounted on the transverse rods 185 and 186 over the structure 106 at the front end of platform 11 is a rigid frame 187. This frame provides guides 188, 189 for members 190, 191 (Fig. 26). Members 190, 191 are arranged for vertical reciprocation. Journaled at 192 on member 183 and at 193 on the rear upper part of frame 187, as best shown in Fig. 15, is a shaft 194. Mounted on this shaft, on either side of the journal at 193, are pinions 195, 196. Racks 197, 198, mounted on the rear of members 190, 191, engage pinions 195 and 196, respectively. Thus, rotation of shaft 194 effects, through the two rack and pinion mechanisms, vertical reciprocation of members 190 and 191, which, it will be understood, are slidably mounted in their respective guides 188 and 189.

On the left-hand end of shaft 194 is another pinion 199 (Fig. 20). This pinion is engaged by a rack 200 fixed on the upper end of a rigid link 201 adapted to be reciprocated up and down and at the same time slightly oscillated (see below). For convenience and safety the rack 200 and pinion 199 are enclosed within a housing 202 mounted on shaft 194 for free rocking movement. The housing is also adapted to provide a guide, not shown, within which the rack 200 may slide. The link 201 is passed through a slot provided in platform 10; and its lower end is pivotally connected at 203 to one end of a lever 204, the other end of which is pivotally mounted at 205 on a bracket 206 secured beneath the platform, Fig. 20. Intermediate the ends of the lever 204 is a roller 207 tracking within a box cam 208 mounted at the end of main shaft 21. As the main shaft rotates, lever 204 is oscillated and link 201 is both oscillated and reciprocated, so that pinion 199 is driven first in one direction and then in the other: in consequence, shaft 194, together with its pinions 195 and 196, is similarly driven, and members 190 and 191 are reciprocated vertically within their guides 188 and 189.

Horizontally disposed beneath members 190, 191 is a bar 209, as shown in Figs. 26 and 28. The bar is rigidly attached to two rods 210 and 211 which are respectively mounted slidably in brackets on the rear sides of the members 190, 191 for vertical movement relative thereto. The bar 209 is normally maintained in the position shown in the figure by means of weights 212 and 213 controlling rods 210 and 211 respectively (indicated by dotted lines in Fig. 26). When, however, members 190 and 191 descend in the presence of a rank of cards positioned in the slots of structure 106, the bar 209 comes to a position resting against the tops of the cards, and during further downward movement of members 190 and 191, this bar remains stationary as the members 190 and 191 have a sliding movement relative to the two rods 210 and 211.

Mounted on the front of members 190, 191 are spring fingers 214 with upwardly inclined pointed ends designed to ride over the upper edge of a carton blank on their downward movement and to snag the carton blank on their upward movement by delicately gouging the front surface of the blank just sufficiently to insure that the blank will follow the spring fingers on said upward movement.

Each spring finger device 214 comprises a substantially vertically disposed lever 215 pivotally mounted at 215a on brackets 215b secured to the front of its related member (190 or 191). Intermediate the lever 215 is a threaded stud 216 driven into the face of the member and passed freely through a suitable bore in the lever. Mounted on stud 216 in front of the lever is a compression spring 217, suitably secured against escape beyond the front end of the stud, and which operates to urge the lower portion of the lever toward the front of the member. At the lower end of the lever, which is bent outwardly from the front of the member at 218, is secured a blade 218a whose edge 218b is normally pressed against the front of the member. It will be seen that the edges 218b of the blades 218a of the two devices 214, being disposed upwardly and rearwardly, cannot gouge a blank during descent. But when members 190 and 191 begin to ascend the edges 218b, forced against the blank by means of compression springs 217, may dig slightly into the paperboard. This action is relied upon to insure raising of the blank with said members. Mounted on each member between brackets 215b and stud 216 is another bracket 219. Pivotally mounted on bracket 219 is a bellcrank 220 which is pivotally connected to a link 221 which latter is pivotally mounted to a bracket 221a fixed on lever 215. Mounted on frame 187 is a stop 222 which is engaged by the top of the horizontal arm of each of said bellcranks when said members are raised to a predetermined position to effect pivotal movement of said bellcranks 220 and said levers 215 whereby the edges 218b are drawn out of contact with the blank by swinging about pivot 215a (to the left as viewed in Fig. 28).

Pivotally mounted at 223 on the front center of frame 187 is a pendant element 224. At its lower end is a roller 225 mounted so that it may rotate freely about a substantially vertical axis. The position of the roller with respect to height, is fixed; it may move slightly outwardly from the face of frame 187 against the action of a leaf spring 225a (Fig. 26). As a carton blank A (together with its then interlocked cards, as will be described below) rises, the blank A is lifted upwardly and its upper part slides in between the face of frame 187 and the roller 225. After the edges 218b of the blades 218a of the devices 214 have released the blank, as described above, the carton blank (and cards) are prevented from falling by the pressure of the roller 225. Attention is directed to the fact that the roller may rotate as the carton assembly is removed from the assembly station endwise (see supra, under discussion of the carton); so although it keeps the carton assembly from falling, it permits free endwise movement thereof.

Mounted on platform 10 in front of the left-hand front corner of platform 11 is a base 226 which supports two hollow standards 227 and 228. The standards are rigidly tied together near their upper ends by a member 229. The standards provide bearings for shafts, vertically disposed within them. Within standard 227, and passed through the base 226 and through platform 10, is journaled a shaft 230. Beneath platform 10 and mounted on the lower end of shaft 230 is a bevel gear 231 in mesh with another bevel gear 232 mounted on main shaft 21 (Fig. 19). Standard 228 serves as a bearing for another shaft 233 only the upper part of which is exposed. Mounted freely on shaft 230 at the top of standard 227 is a bellcrank 234 having legs 235 and 236 (Fig. 32). Legs 235 and 236 are in a common plane near the pivot of the bellcrank; however, just beyond the junction of the two legs, leg 236 is bent upward and then outwardly so that a considerable difference in operational level exists between the two legs (Fig. 20). The extremity of leg 236 is offset as shown in Figs. 15 and 32, and is slotted at 240 to receive freely a member 241 (Fig. 26) which is locked upon a horizontally disposed and axially slidable rod 242 mounted in a bracket 243 secured to the side of frame 187. Rod 242 is adapted to push a blank, with its cards, sidewise away from the assembly station. Keyed on shaft 233 above standard 228 is a cam 244. Mounted on shaft 230 above bellcrank 234 is a sprocket 245 connected by a chain 246 with a sprocket 247 mounted above cam 244 on shaft 233 whereby rotation of shaft 230 effects rotation of shaft 233. (See Fig. 32.) Leg 235 of the bellcrank rides on cam 244. As the cam is rotated, repeated oscillations of the bellcrank are effected; in consequence, leg 236 operates to reciprocate the rod 242 for operative and return movements of its function of pushing a blank and its cards endwise out of the assembly station. The rod 242 is provided with a compression spring 248 adapted to return the rod and bellcrank to normal positions after an operative movement. See Figs. 15 and 26, where the normal positions are shown in solid lines, and the lobe of cam 244 is out of engagement with leg 235 of the bellcrank.

From the member 229 a bracket 249 extends upwardly at a slant, as best seen in Fig. 20. At the outer end of this bracket is a vertically disposed post 250. Secured to the top of shaft 233, above sprocket 247, is a disc 251. Pivotally mounted at 252 on the upper surface of disc 251, through which the upper end of shaft 233 does not protrude, is an arm 253 having a slot 254 at its outer end, said slot fitting over post 250 of bracket 249 (Fig. 32). The outer end of the bracket 249 will be seen to be level with disc 251. As disc 251 is rotated, arm 253 operates as the connecting rod of a crank, and effects oscillation and reciprocation of the slot 254 with respect to post 250. Rigidly mounted on arm 253 at 255 is a holder 256 for a blade 257 having an edge 258 adapted to be driven against the front surface of a blank. Within said holder alongside the blade is a blunt guard member 259 adapted to prevent the edge 258 from gouging the paperboard surface more than a predetermined amount (Fig. 29). As the edge 258 is brought against the front panel of a blank positioned at the assembly station the panel is slightly buckled so as to part the edges $d$ at that corner farthest from said blade as shown in Fig. 29.

Mounted on frame 187 (to the left in Fig. 26) is a bracket 260 having depending therefrom a separator blade 261 disposed in the plane of the carton blank when the latter is in its vertical position at the assembly station. The purpose of the separator blade is to maintain the separation of the edges $d$ of the opposed walls of the carton blank when the latter is raised and later removed endwise from the assembly station as described further in the next paragraph.

The buckling and separator means just described will be understood broadly to consist of a reciprocatory member (blade 258) arranged to push an upper corner of one of the opposed walls of the main carton blank out of line with the adjacent upper corner of the other of said opposed walls and buckle the carton blank sufficiently to effect a slight separation of the other upper corners. The reciprocatory member has a pointed end with an adjacent blunt guard to limit the extent of penetration of the paperboard carton blank stock. The means for lifting the carton blank (including spring fingers 214) operates in conjunction with separator blade 261 so that as the carton blank is lifted with respect to the inserted cross wall blanks, separation of the free upper edges of the opposed walls of the carton blank will be maintained by bringing the separated portions of the free edges on opposite sides of the separator 261 (Fig. 5).

It will be noted in Fig. 30 that the front surfaces of the blocks constituting structure 106 at the front end of platform 11 are not vertical. Instead, beginning at the edge of platform 11 the front surfaces of the blocks are first determined by a plane considerably off the vertical, and next by a plane much nearer the vertical. The structure 106 and the adjacent part of the front of platform 11 (down to the level at which bars 175 enter the front of the platform) serve as the stationary jaw of a clamp, presently to be more particularly described.

On platform 10, between the blank magazine and the front end of platform 11, and but little removed from the latter, are two oppositely disposed brackets 262. Pivotally mounted on and between said brackets is a bellcrank 263 comprising, as one leg thereof, a plate 264, and another leg 265. The outer portion of leg 265 is pivotally connected at 266 to a connecting rod 267 having a yoke 268 at its lower end, which rod passes downwardly through a slot in platform 10 and has a roller 268a to engage a cam 269 mounted on main shaft 21. See Fig. 19. As the main shaft rotates, the bellcrank 263 is oscillated, and the plate 264, one surface of which is shaped to mate with the above described stationary jaw, is repeatedly brought into and out of mating position with said jaw. See Fig. 30. The plate 264 is slotted at 270 (Fig. 33) to permit insertion of the cards or cross wall blanks B when the plate 264 is in clamping position, as shown in Fig. 30. The plate is further slotted at 271 to clear the bars 175. When the plate is in normal, or non-clamping, position, the entire plate is beneath bars 175 as indicated in dotted lines at 264' in Fig. 30.

*The assembly operation*

A carton blank, having been delivered from its magazine 147, rests obliquely on bars 175, certain notches $b$ engaging the horizontal portions of said bars where said bars join the front of platform 11, and the fold of the blank being practically in engagement with the face of the platform. The bellcrank 263 operates to swing its plate 264 into the position shown in full lines in Fig. 30. As the plate swings upwardly and rearwardly it raises the blank to vertical assembling position, and clamps it against the above described jaw—that is, the front of platform 11 and the front of structure 106. As the surface of plate 264 toward the paw is adapted to mate with it, the carton blank is not only carried into a vertical position, but the lower portion of the blank, near its fold, is crimped, as shown. In this position, slots $a$ of the carton blank are in registry with the slots of structure 106 through which cards are to pass: this is predetermined by the engagement of the certain notches $b$ and bars 175, which bars serve not only as supports but as gauges. The fold of the blank is at this stage slightly lower than the tops of the bars 175 where they join platform 11, for, although the blank is clamped, just prior to the clamping operation the blank was still supported by the engagement of notches $b$ and the bars. Thus the level of the upper ends of slots $a$ is only a minute distance higher than the tops of the advancing cross wall blanks or cards.

A next operation is the accelerated advance of the leading rank of cards, more particularly described below; but it is to be understood that other operations will have been initiated at about this time, as will be seen.

The pusher plate 141 engages, from the rear, a relatively slowly advancing rank of cards which are being brought forward over the planed upper surface of platform 11 by a member 89 of the conveying means. The cards of the leading rank at this stage are almost exactly aligned by their converging guides with the slots $a$ of the blank. The pusher plate 141 now pushes this rank forward at a rate much faster than that of the travel of other cards being brought forward by members 89 of the conveying means. As the cards of the rank pass through certain slots of the structure 106 the cards are exactly registered with the slots $a$ into which they are projected to a point at which their slots $i$ are registered with the carton blank. After the cards have been properly positioned the pusher plate 141 retracts by continued operation of the cranks 128 and 129, and pitmans 132 and 135. At this stage the carton and cross wall blanks are joined but not interlocked.

The next step in the operation is to buckle the blank to bring about a separation of portions of the free edges of the opposed walls of the carton blank. This is performed when edge 258 of blade 257 strikes the front wall of the blank. The thrust of blade 257 is sidewise with respect to the assembly, as Fig. 29 clearly shows, and this sidewise movement produces sufficient buckling of the front wall to separate edge $d$ of that wall, or portions thereof, from the same edge of the rear wall, which remains flat against frame 187.

Next the carton blank assembly is lifted to lock the cross wall partitions to the carton blank and simultaneously to bring the separated portions of the opposed walls of the carton blank on opposite sides of separator blade 261. After plate 264 has raised the blank to vertical position the upper part of the blank is flat against frame 187. As members 190 and 191 descend within their guides provided by the frame 187 these members pass downwardly behind the blank. The lower portions of levers 215 of spring fingers 214, together with the blades 218a, pass downwardly in front of the blank. As the descent of members 190 and 191 continues, the bar 209 presently strikes the upper edges of the cards joined with the blank. Bar 209, being beneath members 190 and 191, strikes the cards behind the blank and behind their centers where they are still supported by platform 11. The cards being so supported, the bar is arrested, and members 190 and 191 continue to descend. Presently the extreme operative position of members 190 and 191 is reached, and the upward return movement begins.

After a certain amount of the upward movement of members 190 and 191 has taken place, the clamping plate 264 begins to return to normal position. The pressure of springs 217 effects a slight gouging of edges 218b of blades 218a into the blank so that the blank follows members 190 and 191 upward. It is of importance to note that although the carton blank is raised, bar 209 is bearing upon the tops of the cards and thereby restrains them from following the blank until a predetermined elevation of members 190 and 191 has been obtained. Then bar 209 is positively carried upward with the said members. The separated upper edges d of the carton blank will now lie on opposite sides of separator blades 261.

The interlocking operation has been previously fully described under the discussion of the making of the carton. After the cards are interlocked with the carton blank, and bar 209 no longer operates to restrain the cards, the latter, hanging loosely within the slots a, are raised along with the carton blank.

As the paperboard assembly is raised, the edges d of the blank, where not held apart by separator blade 261, presently are forced between the face of frame 187 and the roller 225 of the pendant element 224. After the blank has been released by the edges 218b of blades 218a when the upper ends of levers 215 strike stop 222 and are caused to swing slightly on their pivots, the roller holds the blank lightly against the face of frame 187 and keeps the assembly—then otherwise free—from falling.

Next the pusher rod 242 strikes the carton blank assembly and pushes it a short distance endwise. The thrust given by rod 242 is sufficient to deliver the leading edges of the blank assembly into an impeller system which, independently, completes the endwise withdrawal of the paperboard assembly and delivers it to the card fanning means and folder.

At this stage the assembly station is prepared for the next joining and interlocking operation.

*The folder*

Mounted on rods 185 and 186 are three similar structures 272, 273, and 274, seen to the right of frame 187 in Fig. 15. Each of these structures provides bearings for a pair of vertical shafts—these shafts being part of the above-mentioned impeller system for removing the paperboard assembly from the assembly station. The system comprises three pairs of cooperating feed rollers, the pairs being aligned so that the paperboard assembly is carried through the pairs sequentially. The feed rollers themselves are obscured in Fig. 15 by gears and sprockets mounted on their shafts above the rollers, but this figure best illustrates the roller distribution. The front elevaional figures 19 and 26 show one roller of each pair, the other roller of each pair being obscured by its companion. When the paperboard assembly is pushed by rod 242 a short distance endwise, the leading edges of the blank are engaged by the first pair of feed rollers, and the paperboard is then carried through the impeller system. The functions of the impeller system are to remove the carton blank assembly rapidly from the assembly station and to convey it from the assembly station to the folder mounted on platform 12.

From left to right, in Fig. 15, the shafts of the first pair of feed rollers are 275 and 276; of the second pair, 277 and 278; and of the third pair, 279 and 280. In the same order, and respectively relating to the shafts as indicated, the feed rollers (all of which are alike), by pairs, are 281 and 282; 283 and 284; and 285 and 286. The even numbered rollers are indicated by arrows with reference numbers where obscured in the drawing. As will be seen in Figs. 19 and 26, the feed rollers are mounted on the lower portions of their respective shafts. Rods 185 and 186 support the bearing structures 272, 273, and 274, the shafts, the rollers, and other elements mounted on said shafts. The rods 185 and 186, as seen in Figs. 15, 19, and 26, are supported at the impeller system by standard 180.

The impeller system is coupled together so that a single drive serves all three pairs of feed rollers, each shaft of a pair being coupled to its companion by intermeshing gears: Gear 287 mounted on shaft 275 meshes with gear 288 mounted on shaft 276; gear 289 on shaft 277 meshes with gear 290 on shaft 278; and gear 291 on shaft 279 meshes with gear 292 on shaft 280. Mounted on shaft 275, above gear 287 (see Fig. 19), is a sprocket 292a by means of which the impeller system is driven. Above sprocket 292a on shaft 275 is another sprocket 293 connected by a chain 294 with a sprocket 295 mounted on shaft 277. Below sprocket 295, and above gear 289, on shaft 277 is another sprocket 296 connected by a chain 297 with a sprocket 298 mounted on shaft 279.

Mounted in a footing 299 based on platform 10 is a hollow standard 300 which provides bearings for a shaft 301, see Fig. 19; this standard being removed in Fig. 26 for clarity. Shaft 301 passes through the footing 299 and through platform 10, and, beneath the platform, a bevel gear 302 is mounted on the lower end of the shaft. Gear 302 meshes with another bevel gear 303 mounted on the main shaft 21. Mounted on shaft 301 above standard 300 is a sprocket 304 which is connected by a chain 305 with sprocket 292a by means of which the impeller system is driven.

Mounted on rods 185 and 186 are two brackets 306 and 307, the first between structures 272 and 273, and the latter near the extreme right-hand ends of the rods (see Fig. 19). These brackets support a member 308 the function of which is to maintain the separation of edges d of the carton blank as it passes through the impeller system, and, after it begins to leave the system, to increase the separation rapidly, so that the opposed walls of the blank will be properly disposed to enter the folder. Member 308 extends from the separator blade 261, as best shown in Fig. 26, to a point just beyond the first element of the folder. That portion 309 of member 308 extending through the impeller system, and just above the feed rollers, as shown in the last named figure, is merely a strip approximatley the thickness of the blade 261 of which said strip may be regarded as a continuation in a functional sense, since after the parted edges d pass beyond the blade they continue on the opposite sides of the strip, which maintains their separation while the assembly is traversing the impeller system. Note the pointed end 310 of portion 309 in Fig. 26. When the blank is raised one edge d passes on one side and the other edge d on the other side of end 310. Portion 311 of member 308 which lies beyond the impeller system is a wedge, as best seen in Fig. 15. The manner in which the separation of edges d is increased as the assembly travels against the wedge is shown clearly in this figure.

Supported above platform 12, as shown in Fig. 18, is an elongated plate 312, disposed slightly off the horizontal with its lower end toward the impeller system and the assembly station. The centerline of this plate is a continuation of the centerline of the impeller system. The plate is supported by means of posts 313 on platform 12. The upper portions of the posts are threaded and pass freely through slots in plate 312. Nuts 313a are provided whereby the disposition of the plate may be adjusted. Supported above and along one side of the centerline of plate 312 is a flanged guide member 314 mounted on posts 315 fixed to plate 312 (Figs. 15 and 31). The upper portions of posts 315 are threaded and pass freely through the guide member. Nuts 316 are provided for adjustment and locking. Supported above and along the other side of the centerline of plate 312 is another flanged guide member 317 mounted on posts 318 fixed to plate 312 (Fig. 31). The upper portions of posts 318 are threaded and pass freely through this last named guide member. Nuts 319 are provided for adjustment and locking. These two guide members are horizontal. Both guide members are elongated and are so positioned with respect to each other as to define a slot aligned with the centerline of plate 312. Member 314 extends from about the middle of plate 312 to that end of the plate nearest the impeller system. But member 317 is much longer, and extends from about the middle of the plate 312 all the way beneath the impeller system nearly to the assembly station, where it ends at 320. The end of this guide member, at 320, serves as a wiper for fanning the cards of a passing carton blank assembly being removed from the assembly station by means of the impeller system. The inner edge of member 317 is provided with a donwardly disposed flange 321 (Fig. 31) which extends from end to end of the member. From the end at 320 to just beyond the beginning of plate 312 the inner edge of member 317 is tapered gently, as can be seen from Fig. 31, so that the fanned cards are smoothed into position as the blank assembly progresses into the folder. The other guide member 314 is also slightly tapered at its front end to accord with the taper of member 317; and the inner edge of member 314 is also provided with a flange 322 disposed similarly to flange 321. Thus the defined slot, designated 323, is walled by the two flanges which serve to keep the card fan intact during the first part of the travel of the paperboard assembly through the folder.

Supported above guide member 314 is a guide member 324; posts 315 also pass freely through this last named member, and nuts 325 are provided for adjustment and locking. Supported above guide member 317 is another guide member 326; posts 318 also pass freely through this last named member, and nuts 327 are provided for adjustment and locking. Guide members 324 and 326 are both narrow elongated plates, and are so disposed with respect to each other as to define a slot 328 aligned with slot 323 beneath. Guide members 324 and 326 extend from about the middle of plate 312 nearly to the assembly station. A paperboard assembly being impelled from the assembly station moves within slot 328, which is provided with a throat by beveling the inner edges of guide members 324 and 326, to insure easy entry of the blank. The height of slot 328 is such that the cards pass beneath members 324 and 326.

Guide members 324 and 326 have a principal function as braces for the blank during the first portion of the folding operation; their height predetermines the breaking of the score g of the walls. The sequence of operation during folding is to separate the walls beginning at edges d, break the scores g, and finally to rotate each wall substantially 180° on axes at scores g. Guide members 324 and 326 prevent the folding effort from affecting the blank beneath scores g so that breaking at the proper level is assured.

Mounted on plate 312 beyond the guide members above mentioned are two elongated angles 329, reversed with respect to each other and having parallel vertical legs (Figs. 18 and 31). These angles are so disposed as to define a slot which is a continuation of both slots 323 and 328. These angles extend from the outer ends of the guide members to and slightly beyond the outer end of plate 312. As is shown in Fig. 18 the heights of the plate 312 and the guide members, as well as that of the angles, is such that a completed carton, at the end of the folder, is disposed on edge on the upper surface of platform 12.

The impeller system delivers a blank assembly between guide members 324 and 326 (with the main carton blank thereof in slot 328) and onto a conveyor comprising a chain 332 having lugs 333 specially adapted to strike the blank without disturbing the fanned cards. See Figs. 18, 19, and 26. The conveyor chain 332 is mounted on sprockets 334 and 335 (Figs. 18 and 26), and suitable slots, not shown, are provided in platform 12 to accommodate the chain and sprockets. The upper part of the chain loop passes over plate 312, within guides 333a, as shown in Figs. 18, 19 and 26; the guides 333a being broken away in part in Figs. 18 and 19 so that the chain 332 may be seen; and beneath slots 323 and 328. The conveyor chain carries the blank assembly through the folder.

Sprocket 334 is mounted on a shaft 336 journaled in pillow blocks 337 secured to platform 12. Sprocket 335 is mounted on a shaft 338 journaled in hangers 339 and 340 secured beneath platform 12. See Fig. 16. Mounted on shaft 338 is another sprocket 341 connected by a chain 342 with a sprocket 343 mounted on a shaft 344 journaled in hangers 345 and 346 secured beneath platform 12. At one end of shaft 344 is a bevel gear 347 in mesh with another bevel gear 348 mounted on a shaft 349 journaled in hangers 350, 351, and 352 secured beneath platform 12. Shaft 349 is disposed longitudinally with respect to platform 12 and extends nearly from end to end thereof. Mounted on shaft 349 at its end nearest the assembly station is a double sprocket 353 connected by a double chain 354 with another double sprocket 355 mounted on the end of main shaft 21.

Mounted on platform 12 are two standards 356 and 357. A cantilever 358 is secured at the top of standard 356, and a like cantilever 359 is secured at the top of standard 357. Both cantilevers extend transversely with respect to platform 12. Mounted at the outer ends of the cantilevers is a rigid rod 360 which extends longitudinally with respect to platform 12 in the center plane of the slots 323 and 328 and the impeller system. See Figs. 16 and 18.

Mounted on rod 360 are eight like brackets 361 through 368, spaced along the rod. Each bracket is rigidly clamped to the rod and provides a pair of oppositely disposed arms, one on each side of the rod. Mounted in each arm of all brackets is one of sixteen folder elements. Each folder element is a rod having its lower end bent forwardly and outwardly with respect to the travel of the carton assembly, and these rods are arranged at progressively lower levels so as to bend the upper portions of the walls outwardly and downwardly as the assembly advances. The folder elements relating to the two arms of a single bracket are other hand to each other but otherwise alike so that, of course, the resulting folding effect is symmetrical.

The folding elements are indexed by pairs, thus: 369 through 376 mounted respectively in brackets 361 through 368.

Beyond the end of the folder is a pair of cooperating feed rollers 377 and 377a (Fig. 17) mounted on vertically disposed shafts 378 and 378a respectively. The shafts are suitably journaled in platform 12. Mounted on shaft 378 above feed roller 377 is a gear 379 in mesh with a gear 380 mounted on shaft 378a above feed roller 377a. Shaft 378 extends beneath platform 12. At its lower end is a bevel gear 381 in mesh with another bevel gear 382 mounted on a shaft 383 journaled in hangers 384 and 385 secured beneath platform 12 (Figs. 17 and 18). Mounted on shaft 383 is a sprocket 386 connected by a chain 387 with another sprocket 388 mounted on shaft 344. Interconnections between shaft 344 and the main shaft 21 have been described. The feed rollers 377 and 377a are impellers; and their function is to receive a complete carton delivered from the folder and to advance it quickly into the stacker.

The stacker

See Figs. 16, 17 and 18. Mounted on platform 12 are two oppositely disposed guide members 389 and 390. These members may be composite structures but for practical purposes are elongated angles disposed transversely with respect to the platform and extending rearward beyond the edge of the platform as cantilevers. These guides are adapted to receive and hold flat folded cartons standing on edge and stacked horizontally. The feed rollers 377 and 377a deliver folded cartons on edge, past the front end of guide 389 with sufficient velocity to send them into the stacker, i. e. against the other guide 390. Slidably mounted within two oppositely disposed brackets 391 and 392 are two bars 393 and 394 to which is rigidly fixed a pusher plate 395 adapted to push cartons sidewise on edge between said guides. The pusher plate operates each time a carton is delivered into the stacker to push that carton rearwardly past means for preventing its return, and, in consequence, cartons so pushed form a more or less tightly packed bundle which may increase in size with limits determined by the length of the guides. Pivotally mounted on the front of the pusher plate at 396 is a link 397 pivotally connected at 398 with a lever 399. Lever 399 has a fulcrum at 400 where it is pivotally mounted on a bracket 401 secured beneath platform 12—the platform being slotted to accommodate the lever. Pivotally connected to the lower end of lever 399 at 402 is a connecting rod 403 having mounted thereon a cam roller 403a for engagement with a cam 404 mounted on the right-hand end of shaft 349. The roller 403a and cam 404 are maintained in engagement by means of spring 404a. Interconnection between shaft 349 and main shaft 21 have been described.

Mounted on platform 12 on either side of the brackets 391 and 392 are standards 405 and 406. Fixed to the top of standard 405 is a cantilever 407; and fixed to the top of standard 406 is another like cantilever 408. Mounted on these cantilevers is a rod 409 having attached thereto two resilient fingers 410 which extend downwardly as shown in Fig. 17. When the pusher plate operates in the presence of a carton, the latter is pushed against these fingers and deflects them in passing; after retraction of the pusher plate the fingers snap back to normal position and prevent return of the carton under normal forces tending to expand the packed bundle of cartons to the rear between said guides. A weight controlled backstop 411, mounted to roll on said guides, prevents collapse of the bundle of cartons while permitting it to expand.

The terms and expressions which I have employed are used in a descriptive and not a limiting sense, and I have no intention of excluding such equivalents of the invention described, or of portions thereof, as fall within the purview of the claims.

I claim:

1. Given medially folded carton blanks having registering slots extending through the opposed walls thereof and arranged normal to the medial fold, and notches along the medial base fold in alignment with said slots, and given cross wall blanks having upwardly extending slots with locking tongues in their base edges, that method of assembling the carton and cross wall blanks which comprises feeding the medially folded carton blanks singly and holding each in turn in its assembling position, arranging several stacks of cross wall blanks in positions separated from the positioned carton blank but such that the planes of the stacked cross wall blanks are substantially parallel to the slots of the carton blank, feeding and guiding a set of cross wall blanks toward the positioned carton blank and projecting them through the registering slots in the walls of said positioned carton blank, buckling the free edge of one of the opposed walls of the medially folded carton blank to separate portions of the free edges of the opposed walls, and lifting said carton blank with respect to the inserted cross wall blanks to bring the separated portions of the free edges on opposite sides of a separator and simultaneously to interlock the tongues of the cross wall blanks with the notches of the carton blank.

2. In the method of assembling slotted cross wall blanks with medially folded and slotted carton blanks, the steps which comprise projecting a set of cross wall blanks through the slots of a carton blank, separating at least a portion of the free edges of the carton blank, and lifting the carton blank with respect to the inserted cross wall blanks to bring separated portions of the free edges on opposite sides of a separator and simultaneously to interlock the cross wall blanks with the carton blank.

3. In mechanism of the class described, an assembly head comprising guides for insertion of cross wall partitions through the slots of a medially folded carton blank, means for buckling the free edge of one of the opposed walls of the carton blank, and means for lifting the carton blank with respect to the inserted cross wall blanks to bring the free edges of the opposed walls on opposite sides of a separator and simultaneously to lock inserted cross wall blanks with the carton blank.

4. In mechanism for assembling cross wall blanks having upwardly extending slots in their base edges with medially folded carton blanks having registering slots extending through the opposed walls thereof and arranged normal to the medial fold, a magazine arranged to feed the carton blanks to an assembly station where the cross wall blanks are projected through the registering slots in the walls of the carton blank, said assembling station comprising a stationary jaw and a plate for clamping a carton blank against said jaw, said clamping plate being mounted for swinging movement to raise the incoming carton blank to vertical assembling position whereby said plate performs the dual function of raising the carton blank to vertical assembling position and clamping the carton blank for the assembling operation.

5. The mechanism as defined by claim 4, which includes a slanting bar for positioning the incoming carton blank prior to the raising movement of said clamping plate, said bar engaging a notch in the base of the carton blank for settling the blank in registration with said jaw.

6. The mechanism as defined by claim 4, which includes a slanting bar for positioning the incoming carton blank prior to the raising movement of said clamping plate, and in which said clamping plate is slotted to receive the cross wall blanks and is further slotted to clear said slanting bar during the swinging movement of the clamping plate.

7. In mechanism for assembling cross wall blanks having upwardly extending slots in their base edges with medially folded carton blanks having registering slots extending through the opposed walls thereof and arranged normal to the medial fold, several magazines arranged to hold cross wall blanks and a magazine for carton blanks, the cross wall magazines being disposed so that the cross wall blanks therein lie substantially vertical whereby they are normal to the planes of the carton blanks and substantially parallel to the slots of the carton blanks when the latter are set up in vertical assembling position, conveyor means for feeding and guiding a set of cross wall blanks toward a positioned carton blank and projecting them through the registering slots in the walls of said positioned carton blank, means for separating the upper edges of the opposed walls of the medially folded carton blank and means for lifting the carton blank with respect to the inserted cross wall blanks while maintaining such separation of the upper edges of the opposed walls of the carton blank.

8. In mechanism for assembling cross wall blanks having upwardly extending slots in their base edges with medially folded carton blanks having registering slots extending through the opposed walls thereof and arranged normal to the medial fold, several magazines arranged to hold cross wall blanks and a magazine for carton blanks, the cross wall magazines being disposed so that the cross wall blanks therein lie substantially vertical whereby they are normal to the planes of the carton blanks and substantially parallel to the slots of the carton blanks when the latter are set up in vertical assembling position, conveyor means for feeding and guiding a set of cross wall blanks toward a positioned carton blank and projecting them through the registering slots in the walls of said positioned carton blank, means for separating the upper edges of the opposed walls of the medially folded carton blank and means for lifting the carton blank with respect to the inserted cross wall blanks while maintaining such separation of the upper edges of the opposed walls of the carton blank, the separating means consisting of a reciprocatory member arranged to push an upper corner of one of said opposed walls out of line with the adjacent upper corner of the other of said opposed walls and buckle the carton blank sufficiently to effect a separation of the other upper corners.

9. In mechanism for assembling cross wall blanks having upwardly extending slots in their base edges with medially folded carton blanks having registering slots extending through the opposed walls thereof and arranged normal to the medial fold, several magazines arranged to hold cross wall blanks and a magazine for carton blanks, the cross wall magazines being disposed so that the cross wall blanks therein lie substantially vertical whereby they are normal to the planes of the carton blanks and substantially parallel to the slots of the carton blanks when the latter are set up in vertical assembling position, conveyor means for feeding and guiding a set of cross wall blanks toward a positioned carton blank and projecting them through the registering slots in the walls of said positioned carton blank, means for separating the upper edges of the opposed walls of the medially folded carton blank and means for lifting the carton blank with respect to the inserted cross wall blanks while maintaining such separation of the upper edges of the opposed walls of the carton blank, the means for lifting the carton blank comprising a pair of spring fingers with pointed ends, said fingers being mounted on a vertically reciprocatory member and being upwardly inclined at their pointed ends to ride over the upper edge of the carton blank on their downward movement and to snag the carton blank on their upward movement.

10. In mechanism for assembling cross wall blanks having upwardly extending slots in their base edges with medially folded carton blanks having registering slots extending through the opposed walls thereof and arranged normal to the medial fold, several magazines arranged to hold cross wall blanks and a magazine for carton blanks, the cross wall magazines being disposed so that the cross wall blanks therein lie substantially vertical whereby they are normal to the planes of the carton blanks and substantially parallel to the slots of the carton blanks when the latter are set up in vertical assembling position, conveyor means for feeding and guiding a set of cross wall blanks toward a positioned carton blank and projecting them through the registering slots in the walls of said positioned carton blank, means for separating the upper edges of the opposed walls of the medially folded carton blank and means for lifting the carton blank with respect to the inserted cross wall blanks while maintaining such separation of the upper edges of the opposed walls of the carton blank, the separating means consisting of a reciprocatory member arranged to push an upper corner of one of said opposed walls out of line with the adjacent upper corner of the other of said opposed walls and buckle the carton blank sufficiently to effect a separation of the other upper corners, said reciprocatory member having a pointed end with an adjacent blunt guard to limit the extent of penetration of the paperboard carton blank stock.

References Cited in the file of this patent

UNITED STATES PATENTS

| | | |
|---|---|---|
| 655,435 | Dexter | Aug. 7, 1900 |
| 1,115,152 | Anderson | Oct. 27, 1914 |
| 1,362,311 | Hohl | Dec. 14, 1920 |
| 1,559,549 | Bullock | Nov. 3, 1925 |
| 1,626,386 | Bronander | Apr. 26, 1927 |
| 1,993,915 | Brown et al. | Mar. 12, 1935 |
| 2,195,916 | Brown et al. | Apr. 2, 1940 |
| 2,224,220 | Dauber | Dec. 10, 1940 |
| 2,394,410 | Tascher | Feb. 5, 1946 |
| 2,642,786 | Gilchrist | June 23, 1953 |